United States Patent
Smejkal

(10) Patent No.: US 12,491,503 B2
(45) Date of Patent: Dec. 9, 2025

(54) HYDROGENATION PROCESS OF OXIME DERIVATIVES

(71) Applicant: SYNGENTA CROP PROTECTION AG, Basel (CH)

(72) Inventor: Tomas Smejkal, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 1196 days.

(21) Appl. No.: 17/291,122

(22) PCT Filed: Nov. 1, 2019

(86) PCT No.: PCT/EP2019/079994
§ 371 (c)(1),
(2) Date: May 4, 2021

(87) PCT Pub. No.: WO2020/094527
PCT Pub. Date: May 14, 2020

(65) Prior Publication Data
US 2021/0387173 A1    Dec. 16, 2021

(30) Foreign Application Priority Data
Nov. 6, 2018  (GB) ..................... 1818113

(51) Int. Cl.
| | |
|---|---|
| *C07C 249/12* | (2006.01) |
| *B01J 31/22* | (2006.01) |
| *C07C 231/12* | (2006.01) |
| *C07C 239/10* | (2006.01) |
| *C07C 239/12* | (2006.01) |
| *C07C 239/20* | (2006.01) |
| *C07D 211/18* | (2006.01) |
| *C07D 231/14* | (2006.01) |
| *C07F 17/00* | (2006.01) |

(52) U.S. Cl.
CPC ......... *B01J 31/2295* (2013.01); *C07C 231/12* (2013.01); *C07C 239/10* (2013.01); *C07C 239/12* (2013.01); *C07C 239/20* (2013.01); *C07D 211/18* (2013.01); *C07D 231/14* (2013.01); *C07F 17/00* (2013.01); *B01J 2531/827* (2013.01); *B01J 2540/32* (2013.01)

(58) Field of Classification Search
None
See application file for complete search history.

(56) References Cited

U.S. PATENT DOCUMENTS

| | | | |
|---|---|---|---|
| 9,051,272 B2 | 6/2015 | Stierli et al. | |
| 9,416,100 B2 | 8/2016 | Dyke et al. | |
| 2015/0080592 A1* | 3/2015 | Talwar | ............ C07F 17/02 556/137 |

FOREIGN PATENT DOCUMENTS

| | | |
|---|---|---|
| CN | 104144914 A | 11/2014 |
| CN | 106466641 A | 3/2017 |
| EP | 1 862 446 A2 | 12/2007 |
| WO | WO 2013153407 | * 10/2013 |

OTHER PUBLICATIONS

Jones (New Chemistry of Hydroxylamines, 2013, Cardiff University Thesis). (Year: 2013).*
English translation of Kadyrov et al. (EP 1862446, pub date Dec. 5, 2007) (Year: 2007).*
Written Opinion of the International Authority and International Search Report for PCT/EP2019/079994 mailed Apr. 2, 2020.
Chinese Office Action issued in Chinese Patent Application No. 201980079013.3, mailed Feb. 28, 2024, with English translation.
Zhang, et al., "Ir-Catalyzed C—H Amidation of Aldehydes with Stoichiometric/ Catalytic Directing Group", Chem. Eur. J., vol. 22, pp. 17808-17812, 2016.
Boutadla, et al., "Alkyne insertion into cyclometallated pyrazole and imine complexes of iridium, rhodium and ruthenium; relevance to catalytic formation of carbo- and heterocycles", Dalton Trans, vol. 39, pp. 10447-10457, 2010.

* cited by examiner

*Primary Examiner* — Renee Claytor
*Assistant Examiner* — Jennifer C Sawyer
(74) *Attorney, Agent, or Firm* — BakerHostetler; Toni-Junell Herbert

(57) ABSTRACT

The present invention relates to a novel process for the iridium-catalysed hydrogenation of oximes. The invention also relates to novel iridium catalysts for use in the iridium-catalysed hydrogenation of oximes and to processes of preparation of these catalysts. The invention further relates to the use of the novel iridium catalysts in ionic hydrogenation of other unsaturated substrates.

10 Claims, No Drawings

HYDROGENATION PROCESS OF OXIME DERIVATIVES

CROSS-REFERENCE TO RELATED APPLICATIONS

This application is a 371 National Stage application of International Application No. PCT/EP2019/079994 filed Nov. 1, 2019, which claims priority to GB 1818113.1, filed Nov. 6, 2018, the entire contents of these applications are hereby incorporated by reference.

The present invention relates to a novel process for the iridium-catalysed hydrogenation of oximes. The invention also relates to novel iridium catalysts for use in the iridium-catalysed hydrogenation of oximes and to processes of preparation of these catalysts. The invention further relates to the use of the novel iridium catalysts in ionic hydrogenation of other unsaturated substrates.

The reduction of oximes and oxime ethers to the corresponding hydroxylamine derivatives is a useful step in many organic syntheses;

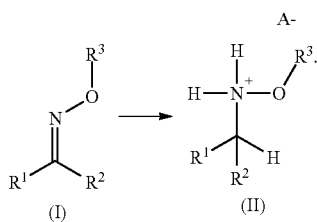

Reduction of oximes and oxime ethers using sodium cyanoborohydride or borane complexes such as borane triethylamine complex are described in WO13/127764. The main disadvantages of the borane reduction methods are the high cost of the reducing agent, low atom economy of the process resulting in formation of stoichiometric amounts of waste and the toxicity of cyanoborohydride. In many cases the borane oxime reduction suffers from over-reduction to the corresponding primary amine (*J. Chem. Soc. Perkin Trans. I*, 1985, 2039).

WO13/127764 discloses heterogeneous hydrogenation of oximes and oxime ethers to hydroxylamines in the presence of a platinum-carbon catalyst and a strong acid such as sulphuric or hydrochloric acid. The main disadvantages of this method are the harsh reaction conditions and limited scope, for example, other easily reducible functional groups on the substrate such as nitro- or alkene-groups are not tolerated. In some cases the heterogeneous oxime to hydroxylamine hydrogenation suffers from over-reduction to the corresponding primary amine as well as catalyst poisoning.

Reports on homogeneous hydrogenation of oximes and oxime ethers to hydroxylamines are scarce. The transition-metal-catalysed hydrogenation of oximes is commonly plagued by over-reduction to the corresponding primary amine and low catalytic efficiency (cobalt catalysis—*Bull. Chem. Soc. Jpn.* 1963, 36, 763; ruthenium catalysis—*Tetrahedron*: Asymmetry 1992, 3, 1283; rhodium catalysis—*J. Chem. Soc. Chem. Commun.* 1995, 1767; *Org. Lett.* 2013, 15, 484; *Tetrahedron: Asymmetry* 2016, 27, 268; iridium catalysis—*Synth. Commun.* 2001, 31, 2767).

EP1862446 discloses a homogeneous iridium-catalysed hydrogenation of ethyl 3-methoxyiminobutanoate derivatives using a combination of hydrogen at 60 bar, bis (1,5-cyclooctadiene) iridium(I)tetrafluoroborate, and (R)-1-[(S)-2-diphenylphosphinoferrocenyl] ethyl di-tert-butylphosphine. However, in practice this method is limited in scope to oximes of 3-ketoesters. Such substrates tautomerize to 2,3-unsaturated esters and so the described oxime hydrogenation reaction is in fact a carbon-carbon double bond reduction.

*Angew. Chem. Int. Ed.* 2014, 53, 13278 and *Chem. Eur. J.* 2015, 21, 17583 disclose a homogenous hydrogenation of oxime derivatives using a tris(pentafluorophenyl)borane catalyst, however, this method is limited to oxime ethers bearing a bulky O-substituent (t-butyl or $Si[(CH_3)_2CH]_3$), and utilises relatively harsh reaction conditions (5% catalyst, 60-100 bar $H_2$).

*Org. Biomol. Chem*, 2013, 11, 6934 and related patent applications WO13/153407 and WO13/153408 disclose certain cyclopentadienyl iridium catalysts for the reductive amination of ketones and aldehydes via the corresponding imines. However, the catalysts disclosed have been found to be inefficient for the reduction of oximes.

We have now found that the reduction of oximes using hydrogen can be carried out under relatively mild conditions through the use of certain selected iridium catalysts.

According to the present invention there is provided a process for the hydrogenation of an oxime of formula (I) to produce a hydroxylamine salt of formula (II) by reacting oxime (I) with hydrogen in the presence of an iridium catalyst of formula (IIIa) or formula (IIIb) and an acid;

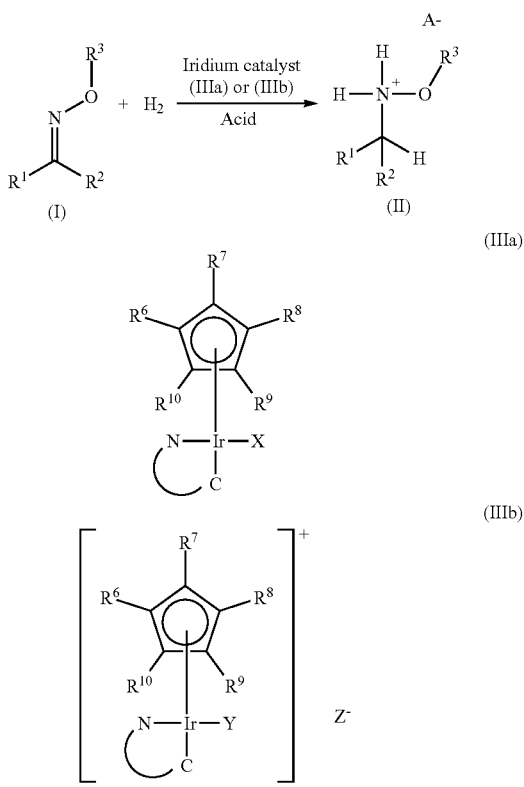

wherein $R^1$, $R^2$ and $R^3$ are each independently hydrogen, $C_1$-$C_8$alkyl, $C_1$-$C_8$hydroxyalkyl, $C_1$-$C_8$cyanoalkyl, $C_1$-$C_6$alkoxyC$_1$-$C_8$alkyl, di($C_1$-$C_6$alkoxy)$C_1$-$C_8$alkyl, $C_1$-$C_8$haloalkyl, $C_2$-$C_6$alkenyl, $C_3$-$C_8$cycloalkyl, phenyl, phenylC$_1$-$C_3$alkyl or heteroaryl, and wherein the cycloalkyl and phenyl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, nitro and $C_2$-$C_6$alkenyl; or $R^1$ and $R^2$ together with the carbon atom to which they are attached may form a 4- to 8-membered saturated cycloalkyl or heterocyclyl ring, wherein the heterocyclic moiety is a non-aromatic monocyclic ring which comprises 1, 2 or 3 heteroatoms, wherein the heteroatoms are individually selected from N, O and S.

Preferably, $R^1$, $R^2$ and $R^3$ are each independently hydrogen, $C_1$-$C_4$alkyl, $C_1$-$C_4$hydroxyalkyl, $C_1$-$C_4$cyanoalkyl, $C_1$-$C_3$alkoxy$C_1$-$C_4$alkyl, di($C_1$-$C_3$alkoxy)$C_1$-$C_4$alkyl, $C_1$-$C_4$haloalkyl, $C_2$-$C_3$alkenyl, $C_3$-$C_6$cycloalkyl, phenyl, phenyl$C_1$-$C_2$alkyl or heteroaryl, and wherein the cycloalkyl and phenyl moieties are each optionally substituted with 1, 2 or 3 groups selected from hydroxyl, halogen, $C_1$-$C_3$alkyl, $C_3$-$C_6$cycloalkyl, $C_1$-$C_3$haloalkyl, $C_1$-$C_3$alkoxy, phenyl, heteroaryl, $C_1$-$C_3$alkoxycarbonyl, acylamino, amido, cyano, nitro and $C_2$-$C_3$alkenyl; or $R^1$ and $R^2$ together with the carbon atom to which they are attached may form a 4- to 6-membered saturated cycloalkyl or heterocyclyl ring, wherein the heterocyclic moiety is a non-aromatic monocyclic ring which comprises 1, 2 or 3 heteroatoms, wherein the heteroatoms are individually selected from N, O and S.

More preferably, $R^1$, $R^2$ and $R^3$ are each independently hydrogen, $C_1$-$C_4$alkyl, $C_1$-$C_4$hydroxyalkyl, $C_1$-$C_3$alkoxy$C_1$-$C_4$alkyl, di($C_1$-$C_3$alkoxy)$C_1$-$C_4$alkyl, $C_1$-$C_4$haloalkyl, $C_2$-$C_3$alkenyl, phenyl and phenyl$C_1$-$C_2$alkyl, and wherein the phenyl moiety may be optionally substituted with 1, 2 or 3 groups selected from halogen, $C_1$-$C_3$alkyl, $C_1$-$C_3$haloalkyl, $C_1$-$C_3$alkoxy, $C_1$-$C_3$alkoxycarbonyl, hydroxyl, and nitro, preferably chloro, methyl, methoxy, methoxycarbonyl, and nitro.

In one set of embodiments $R^1$ represents tert-butyl, methoxycarbonyl, 1,1-dimethoxymethyl, cyclopropyl, phenyl or benzyl, wherein the aromatic ring of each phenyl or benzyl moiety is optionally substituted with 1, 2, or 3 groups independently selected from chloro, methyl, methoxy, methoxycarbonyl and nitro;

$R^2$ represents hydrogen, methyl or ethyl; and $R^3$ represents hydrogen, methyl, ethyl, isopropyl, t-butyl, allyl or benzyl.

In another set of embodiments $R^1$ represents tert-butyl, methoxycarbonyl, 1,1-dimethoxymethyl, cyclopropyl, 2-methylphenyl, 2-chlorophenyl, 4-nitrophenyl, 4-methoxyphenyl, 2-bromobenzyl, 4-methoxybenzyl, or 2,4,6-trichlorobenzyl;

$R^2$ represents hydrogen, methyl or ethyl; and $R^3$ represents hydrogen, methyl, ethyl, isopropyl, t-butyl, allyl or benzyl.

In one set of embodiments $R^1$ represents phenyl or benzyl, wherein the aromatic ring of each phenyl or benzyl moiety is optionally substituted with 1, 2, or 3 groups independently selected from chloro, methyl, methoxy, methoxycarbonyl or nitro;

$R^2$ represents hydrogen or methyl; and $R^3$ represents hydrogen, methyl, ethyl, isopropyl, t-butyl, allyl or benzyl.

In a most preferred embodiment, the hydroxylamine of formula (II) is N-methoxy-1-(2,4,6-trichlorophenyl)propan-2-amine (II-1).

$R^6$, $R^7$, $R^8$, $R^9$ and $R^{10}$ are each independently hydrogen or $C_1$-$C_3$alkyl. Preferably, $R^6$, $R^7$, $R^8$, $R^9$ and $R^{10}$ are each independently hydrogen or methyl, more preferably, $R^6$, $R^7$, $R^8$, $R^9$ and $R^{10}$ each represent methyl.

Represents a bidentate chelating ligand comprising at least one carbon atom which coordinates to iridium and at least one nitrogen atom which coordinates to iridium. Many metal-chelating ligands are known to those skilled in the art, and will be suitable for use in the present invention. Particularly suitable bidentate chelating ligands are those with a 1,4-relationship between the coordinating nitrogen and carbon atoms, preferably, those where the coordinating carbon atom forms part of a phenyl ring, wherein said phenyl ring is substituted in the ortho position.

Preferred bidentate chelating C,N ligands are ligands of structure (IV), (IVa) or (IVb):

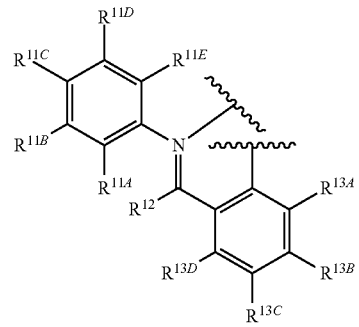

(IV)

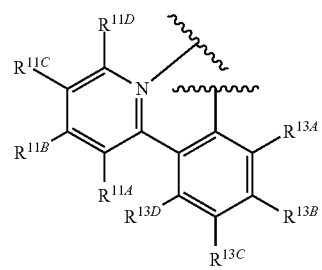

(IVa)

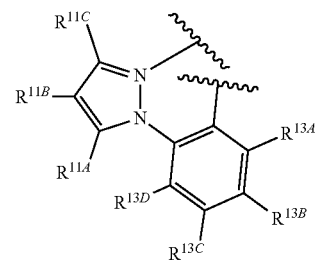

(IVb)

wherein $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, halogen, $C_1$-$C_8$alkyl, $C_1$-$C_8$alkoxy, $C_1$-$C_8$haloalkyl, $C_1$-$C_8$haloalkoxy, hydroxy$C_1$-$C_8$alkoxy, $C_1$-$C_8$alkoxy$C_1$-$C_6$alkoxy, $C_1$-$C_8$alkoxycarbonyl, $C_1$-$C_8$alkoxycarbonyl$C_1$-$C_6$alkoxy, $C_1$-$C_8$alkylcarbonyl$C_1$-$C_6$alkoxy, phenoxy, or nitro;

$R^{12}$ is hydrogen, $C_1$-$C_8$alkyl or phenyl; and wherein each phenyl moiety is optionally substituted by 1 to 5 groups selected from $C_1$-$C_8$alkyl and $C_1$-$C_8$alkoxy; or wherein the bidentate chelating ligand is (IVa) or (IVb), $R^{11A}$ and $R^{13D}$ together with the carbon atoms to which they are attached may form a 5- or 6-membered unsaturated ring, preferably $R^{11A}$ and $R^{13D}$ together with the carbon atoms to which they are attached may form a 6-membered unsaturated ring; or $R^{12}$ and $R^{13D}$ together with the carbon atoms to which they are attached may form a 5- to 8-membered partially saturated or unsaturated cycloalkyl or heterocyclyl ring, wherein the heterocyclic moiety is a non-aromatic ring which comprises 1 or 2 heteroatoms, and wherein the heteroatoms are independently selected from N, O and S. In one embodiment, $R^{12}$ and $R^{13D}$ together with the carbon atoms to which they are attached may form a 6- to 8-membered partially saturated or unsaturated cycloalkyl or heterocyclyl ring, wherein the heterocyclic moiety is a non-aromatic ring which comprises 1 or 2 heteroatoms, wherein the heteroatoms are independently selected from N, O and S.

Preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, halogen, $C_1$-$C_3$alkoxy, hydroxy$C_1$-$C_3$alkoxy, $C_1$-$C_3$alkoxy$C_1$-$C_3$alkoxy, $C_1$-$C_3$alkoxycarbonyl$C_1$-$C_3$alkoxy, $C_1$-$C_3$alkyl, $C_1$-$C_3$alkoxy or nitro, and $R^{12}$ is hydrogen, $C_1$-$C_3$alkyl or phenyl; and wherein each phenyl moiety is optionally substituted by 1 to 3 groups selected from $C_1$-$C_3$alkyl and $C_1$-$C_3$alkoxy; more preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, halogen, $C_1$-$C_3$alkoxy, hydroxy$C_1$-$C_3$alkoxy, $C_1$-$C_3$alkoxy$C_1$-$C_3$alkoxy, or $C_1$-$C_3$alkoxycarbonyl$C_1$-$C_3$alkoxy, and $R^{12}$ is hydrogen, $C_1$-$C_3$alkyl or phenyl; and wherein each phenyl moiety is optionally substituted by 1 to 3 groups selected from $C_1$-$C_3$alkyl and $C_1$-$C_3$alkoxy; or wherein the bidentate chelating ligand is (IVa) or (IVb), $R^{11A}$ and $R^{13D}$ together with the carbon atoms to which they are attached may form a 5- or 6-membered, preferably a 6-membered unsaturated ring; or $R^{12}$ and $R^{13D}$ together with the carbon atom to which they are attached may form a 5- to 7-membered, preferably a 6- or 7-membered, partially saturated cycloalkyl or heterocyclyl ring, wherein the heterocyclic moiety is a non-aromatic ring which comprises one O atom. In one embodiment $R^{12}$ and $R^{13D}$ together with the carbon atom to which they are attached may form a 5- or 6-membered partially saturated cycloalkyl or heterocyclyl ring, wherein the heterocyclic moiety is a non-aromatic ring which comprises one O atom.

More preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, methyl, methoxy, ethoxy, 2-hydroxyethoxy, 2-methoxyethoxy, methoxycarbonyl-methoxy, iso-propoxycarbonyl-methoxy, or nitro, and $R^{12}$ is hydrogen, methyl or phenyl; and wherein each phenyl moiety is optionally substituted by a single methoxy group; more preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, methyl, methoxy, ethoxy, 2-hydroxyethoxy, 2-methoxyethoxy, methoxycarbonyl-methoxy, or iso-propoxycarbonyl-methoxy, or $R^{12}$ and $R^{13D}$ together with the carbon atom to which they are attached may form a 6- or 7-membered partially saturated cycloalkyl or heterocyclyl ring, wherein the heterocyclic moiety is a non-aromatic ring which comprises one oxygen atom.

In one embodiment, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, $C_1$-$C_8$alkyl, $C_1$-$C_8$alkoxy, or nitro.

Examples of bidentate chelating ligands are compounds of formulas (IV-1), (IV-2), (IV-3), (IV-5), (IV-6), (IV-7), (IV-8), (IV-9), (IV-10), (IV-11), or (IV-12) as shown below:

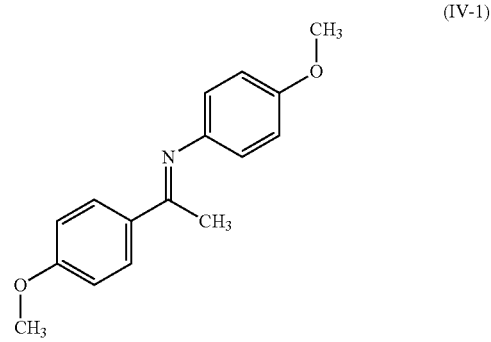

(IV-1)

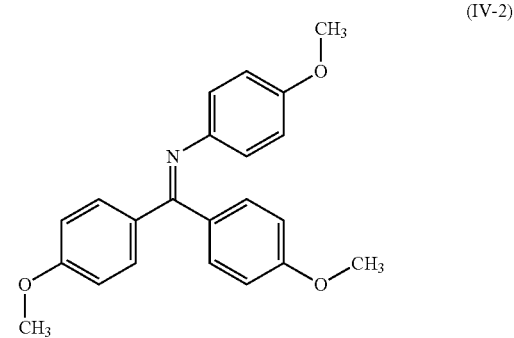

(IV-2)

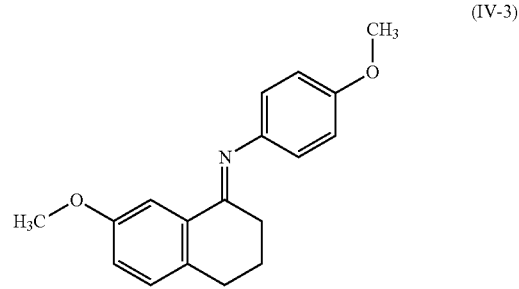

(IV-3)

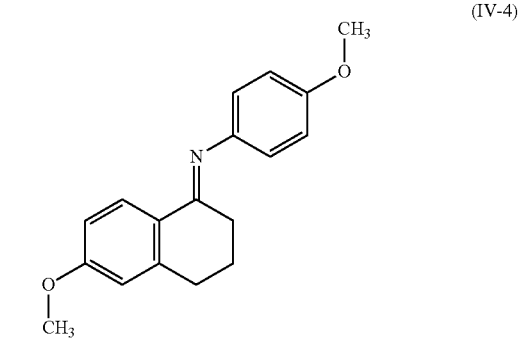

(IV-4)

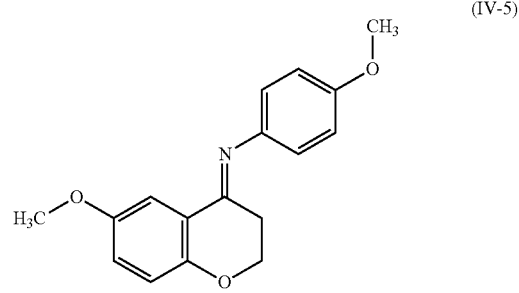

(IV-5)

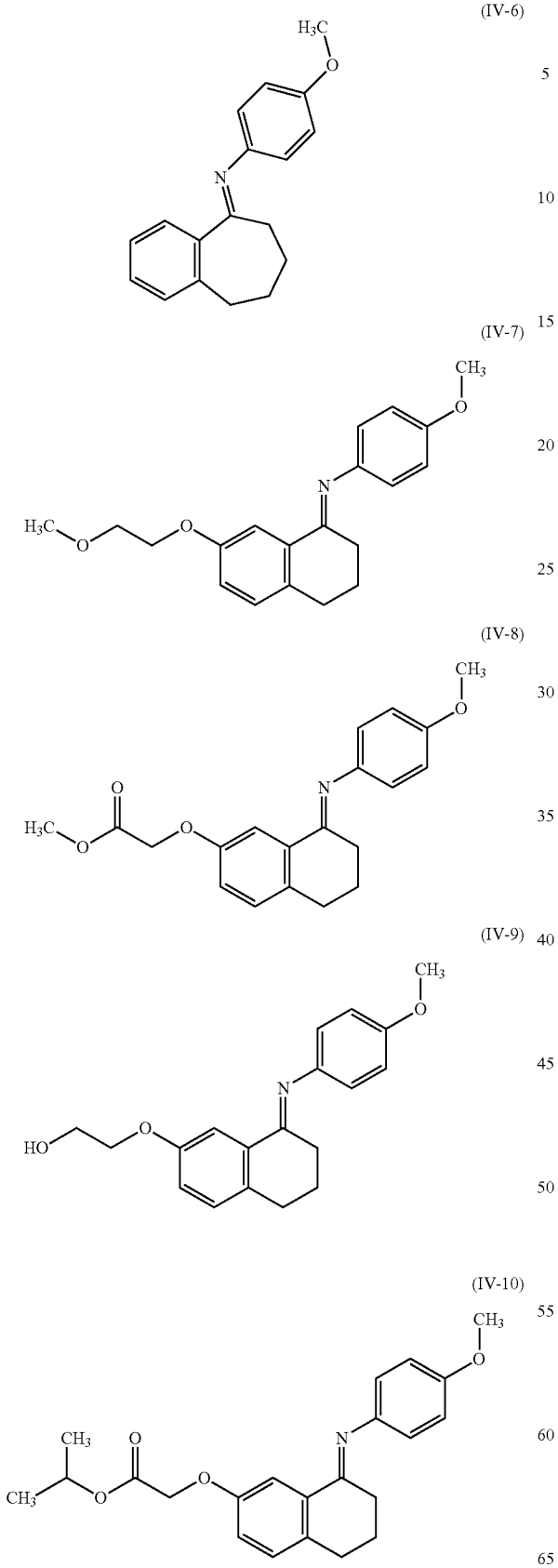

X represents an anionic group, that is, a group with a net negative charge, and wherein X is not a halogen. In complexes (IIIa) wherein X is a halogen, we have found that the anionic group is too tightly bound to the metal and such complex doesn't give sufficient amount of the catalytically active hydride intermediate under neutral or acidic hydrogenation conditions. Examples of suitable anionic groups X include the anionic ligands of the formula $R^{14}$—$SO_2O$— or $R^{15}$—$C(O)O$—, wherein $R^{14}$ is halogen, hydroxy, $C_{1-6}$alkyl, $C_{1-6}$alkoxy, $C_{1-6}$haloalkyl, or phenyl, wherein the phenyl moieties are optionally substituted by 1, 2, 3 or 4 substituents, which may be the same or different, selected from $R^{16}$;

$R^{16}$ is $C_{1-4}$alkyl, $C_{1-4}$haloalkyl, nitro, or halogen, preferably methyl, ethyl, trifluoromethyl, nitro or halogen, more preferably methyl or halogen, even more preferably methyl, chloro or fluoro.

Preferably, $R^{14}$ is hydroxy, methyl, trifluoromethyl, phenyl or tolyl.

$R^{15}$ is $C_{1-6}$haloalkyl or phenyl, wherein the phenyl moieties are optionally substituted by 1, 2, 3 or 4 substituents, which may be the same or different, selected from $R^{17}$.

$R^{17}$ is $C_{1-4}$alkyl, $C_{1-4}$haloalkyl, nitro or halogen.

Preferably, $R^{15}$ is trifluoromethyl.

In one embodiment, X represents a group of the formula $R^{14}$—$SO_2O$. In one embodiment, X is mesylate, tosylate, nosylate, sulfate, hydrogensulfate, triflate or trifluoroacetate.

Y represents a neutral ligand, that is, a ligand without an overall charge. Examples of neutral ligands include, but are not limited to $H_2O$, alcohols, ethers, ketones, esters, amides and nitriles. Preferably, Y is $H_2O$, PhCN or MeCN, more preferably, $H_2O$ or MeCN, and most preferably Y is $H_2O$.

Z represents an anionic group, that is, a group with a net negative charge, and wherein Z is not a halogen. Examples of anionic groups include ligands of the formula $R^{14}$—$SO_2O^-$ (wherein $R^{14}$ is described above), tetrafluoroborate, hexafluorophosphate, perchlorate, tetraphenylborate, tetrakis(3,5-bis(trifluoromethyl)phenyl)borate, tetrakis(pentafluorophenyl)borate, fluorinated alkoxyaluminates, mesylate, triflate, tosylate, nitrate, hydrogenosulfate or sulfate, and other weakly coordinating anionic groups. Preferably, Z is of the formula $R^{14}$—$SO_2O^-$ (wherein $R^{14}$ is described above), mesylate, sulfate, hydrogenosulfate, tetrafluoroborate, hexafluorophosphate, tetraphenylborate, or tetrakis(3,5-bis(trifluoromethyl)phenyl)borate, more preferably, mesylate or tetrafluoroborate.

There is also provided a process in which the N-methoxy-1-(2,4,6-trichlorophenyl)propan-2-amine (II-1) as produced by the above process is further reacted with 3-(difluoromethyl)-1-methyl-pyrazole-4-carbonyl chloride (XII) to provide 3-(difluoromethyl)-N-methoxy-1-methyl-N-[1-methyl-2-(2,4,6-trichlorophenyl)ethyl]pyrazole-4-carboxamide (XIII):

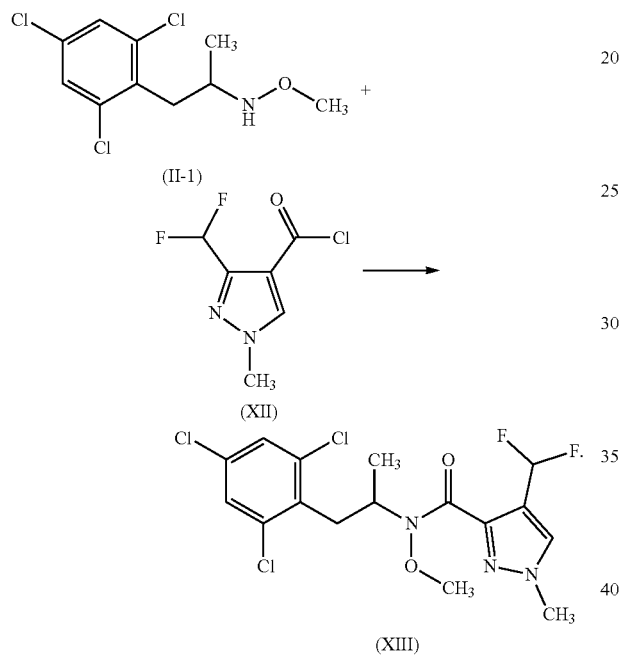

In one embodiment of the invention, the iridium catalyst is a compound of formula (III-1), (III-11), (III-17), (III-18), or (III-19), preferably the iridium catalyst is a compound of formula (III-1), there is also provided a compound of formula (III-1), (III-11), (NI-17), (III-18), or (III-19), preferably there is provided a compound of formula (III-1):

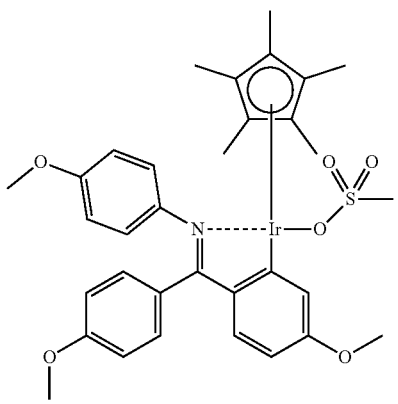

(III-11)

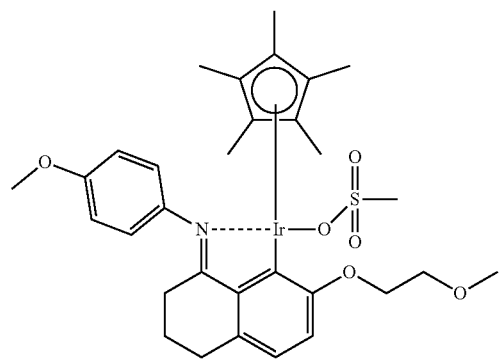

(III-17)

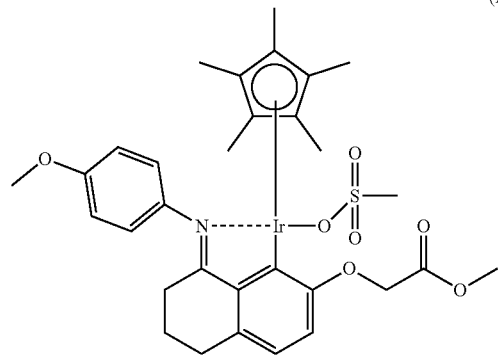

(III-18)

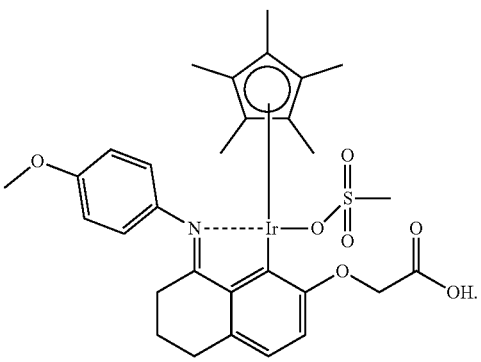

(III-19)

In another embodiment of the invention, there is provided a compound of formula (IIIc) or (IIId):

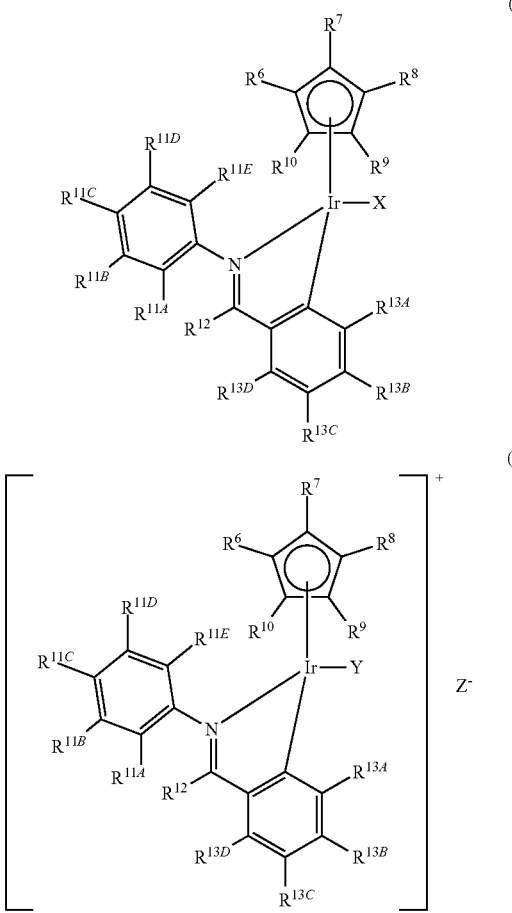

wherein R⁶, R⁷, R⁸, R⁹ and R¹⁰ are each independently hydrogen or $C_1$-$C_3$alkyl. Preferably, R⁶, R⁷, R⁸, R⁹ and R¹⁰ are each independently hydrogen or methyl, more preferably, R⁶, R⁷, R⁸, R⁹ and R¹⁰ each represent methyl;

wherein $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, halogen, $C_1$-$C_8$alkyl, $C_1$-$C_8$alkoxy, $C_1$-$C_8$haloalkyl, $C_1$-$C_8$haloalkoxy, hydroxy$C_1$-$C_8$alkoxy, $C_1$-$C_6$alkoxy$C_1$-$C_6$alkoxy, $C_1$-$C_8$alkoxycarbonyl, $C_1$-$C_8$alkoxycarbonyl$C_1$-$C_6$alkoxy, $C_1$-$C_8$alkylcarbonyl$C_1$-$C_6$alkoxy, phenoxy, or nitro;

$R^{12}$ is hydrogen, $C_1$-$C_8$alkyl or phenyl; and wherein each phenyl moiety is optionally substituted by 1 to 5 groups selected from $C_1$-$C_8$alkyl and $C_1$-$C_8$alkoxy; or $R^{12}$ and $R^{13D}$ together with the carbon atoms to which they are attached may form a 5- to 8-membered partially saturated or unsaturated cycloalkyl or heterocyclyl ring, wherein the heterocyclic moiety is a non-aromatic ring which comprises 1 or 2 heteroatoms, and wherein the heteroatoms are independently selected from N, O and S. In one embodiment, $R^{12}$ and $R^{13D}$ together with the carbon atoms to which they are attached may form a 6- to 8-membered partially saturated or unsaturated cycloalkyl or heterocyclyl ring, wherein the heterocyclic moiety is a non-aromatic ring which comprises 1 or 2 heteroatoms, wherein the heteroatoms are independently selected from N, O and S;

X is mesylate, tosylate, nosylate, sulfate, hydrogensulfate, triflate, or trifluoroacetate;

Y is $H_2O$, PhCN or MeCN; and

Z is mesylate, tosylate, nosylate, sulfate, hydrogenosulfate, triflate, tetrafluoroborate, hexafluorophosphate, tetraphenylborate or tetrakis(3,5-bis(trifluoromethyl)phenyl)borate.

Preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, halogen, $C_1$-$C_3$alkoxy, hydroxy$C_1$-$C_3$alkoxy, $C_1$-$C_3$alkoxy$C_1$-$C_3$alkoxy, $C_1$-$C_3$alkoxycarbonyl$C_1$-$C_3$alkoxy, $C_1$-$C_3$alkyl, $C_1$-$C_3$alkoxy or nitro, and $R^{12}$ is hydrogen, $C_1$-$C_3$alkyl or phenyl; and wherein each phenyl moiety is optionally substituted by 1 to 3 groups selected from $C_1$-$C_3$alkyl and $C_1$-$C_3$alkoxy; more preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, halogen, $C_1$-$C_3$alkoxy, hydroxy$C_1$-$C_3$alkoxy, $C_1$-$C_3$alkoxy$C_1$-$C_3$alkoxy, or $C_1$-$C_3$alkoxycarbonyl$C_1$-$C_3$alkoxy, and $R^{12}$ is hydrogen, $C_1$-$C_3$alkyl or phenyl; and wherein each phenyl moiety is optionally substituted by 1 to 3 groups selected from $C_1$-$C_3$alkyl and $C_1$-$C_3$alkoxy; or $R^{12}$ and $R^{13D}$ together with the carbon atom to which they are attached may form a 5- to 7-membered, preferably a 6- or 7-membered partially saturated cycloalkyl or heterocyclyl ring, wherein the heterocyclic moiety is a non-aromatic ring which comprises one O atom. In one embodiment $R^{12}$ and $R^{13D}$ together with the carbon atom to which they are attached may form a 5- or 6-membered partially saturated cycloalkyl or heterocyclyl ring, wherein the heterocyclic moiety is a non-aromatic ring which comprises one O atom.

More preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, methyl, methoxy, ethoxy, 2-hydroxyethoxy, 2-methoxyethoxy, methoxycarbonyl-methoxy, iso-propoxycarbonyl-methoxy, or nitro, and $R^{12}$ is hydrogen, methyl or phenyl; and wherein each phenyl moiety is optionally substituted by a single methoxy group; more preferably, $R^{11A}$, $R^{11B}$, $R^{11C}$, $R^{11D}$, $R^{11E}$, $R^{13A}$, $R^{13B}$, $R^{13C}$, and $R^{13D}$ are each independently hydrogen, methyl, methoxy, ethoxy, 2-hydroxyethoxy, 2-methoxyethoxy, methoxycarbonyl-methoxy, or iso-propoxycarbonyl-methoxy; or $R^{12}$ and $R^{13D}$ together with the carbon atom to which they are attached may form a 6- or 7-membered, preferably a 6-membered, partially saturated cycloalkyl or heterocyclyl ring, wherein the heterocyclic moiety is a non-aromatic ring which comprises one O atom.

As used herein, the term "halogen" or "halo" refers to fluorine (fluoro), chlorine (chloro), bromine (bromo) or iodine (iodo), preferably fluorine, chlorine or bromine. Most preferably halogen is chlorine.

As used herein, cyano means a —CN group.

As used herein, the term "hydroxyl" or "hydroxy" means an —OH group.

As used herein, amino means an —$NH_2$ group.

As used herein, acylamino means an —NH(C═O)$R_a$ group, where $R_a$ is a $C_1$-$C_4$alkyl radical as generally defined below.

As used herein, amido means an —(C═O)NR$_a$R$_a$ group, where $R_a$ is independently selected from hydrogen or a $C_1$-$C_4$alkyl radical as generally defined below.

As used herein, nitro means an —$NO_2$ group.

As used herein, the term "$C_1$-$C_8$alkyl" refers to a straight or branched hydrocarbon chain radical consisting solely of carbon and hydrogen atoms, containing no unsaturation, having from one to six carbon atoms, and which is attached to the rest of the molecule by a single bond. $C_1$-$C_6$alkyl, $C_1$-$C_4$alkyl, $C_1$-$C_3$alkyl and $C_1$-$C_2$alkyl are to be construed accordingly. Examples of $C_{1-8}$alkyl include, but are not limited to, methyl, ethyl, n-propyl, 1-methylethyl (isopropyl), n-butyl, and 1-dimethylethyl (t-butyl). A "$C_1$-$C_2$alkylene" group refers to the corresponding definition of $C_1$-$C_2$alkyl, except that such radical is attached to the rest of the molecule by two single bonds. Examples of $C_1$-$C_2$alkylene, are —$CH_2$— and —$CH_2CH_2$—.

As used herein, the term "$C_2$-$C_6$alkenyl" refers to a straight or branched hydrocarbon chain radical group consisting solely of carbon and hydrogen atoms, containing at least one double bond that can be of either the (E)- or (Z)-configuration, having from two to six carbon atoms, which is attached to the rest of the molecule by a single bond. Examples of $C_2$-$C_6$alkenyl include, but are not limited to, ethenyl (vinyl), prop-1-enyl, prop-2-enyl (allyl), and but-1-enyl.

As used herein, the term "$C_1$-$C_8$alkoxy" refers to a radical of the formula —$OR_a$ where $R_a$ is a $C_{1-8}$alkyl radical as generally defined above. The terms $C_1$-$C_6$alkoxy, $C_1$-$C_4$alkoxy, $C_1$-$C_3$alkoxy and $C_1$-$C_2$alkoxy are to be construed accordingly. Examples of $C_{1-6}$alkoxy include, but are not limited to, methoxy, ethoxy, propoxy, isopropoxy, and f-butoxy.

As used herein, the term "$C_1$-$C_8$haloalkyl" refers to a $C_1$-$C_8$alkyl radical as generally defined above substituted by one or more of the same or different halogen atoms. Examples of $C_1$-$C_8$haloalkyl include, but are not limited to fluoromethyl, fluoroethyl, difluoromethyl, trifluoromethyl, 2,2,2-trifluoroethyl, and 3,3,3-trifluoropropyl.

As used herein, the term "$C_1$-$C_8$haloalkoxy" refers to a $C_1$-$C_8$alkoxy radical as generally defined above substituted by one or more of the same or different halogen atoms.

As used herein, the term "hydroxy$C_1$-$C_8$alkyl" refers to a $C_1$-$C_8$alkylene radical as generally defined above substituted by one or more hydroxy groups as defined above.

As used herein, the term "hydroxy$C_1$-$C_8$alkoxy" refers to a $C_1$-$C_8$alkoxy radical as generally defined above substituted by one or more hydroxy groups as defined above.

As used herein, the term "cyano$C_1$-$C_8$alkyl" refers to a $C_1$-$C_8$alkylene radical as generally defined above substituted by one or more cyano groups as defined above.

As used herein, the term "$C_1$-$C_8$alkoxy$C_1$-$C_6$alkoxy" refers to a radical of the formula $R_bO$—$R_aO$— where $R_b$ is a $C_1$-$C_8$alkyl radical as generally defined above, and $R_a$ is a $C_1$-$C_6$alkylene radical as generally defined above. Examples of $C_1$-$C_8$alkoxy$C_1$-$C_6$alkoxy include, but are not limited to, methoxymethoxy, ethoxymethoxy, and methoxyethoxy.

As used herein, the term "$C_1$-$C_8$alkoxycarbonyl" refers to a radical of the formula $R_aOC(O)$—, where $R_a$ is a $C_1$-$C_8$alkyl radical as generally defined above.

As used herein, the term "$C_1$-$C_6$alkoxy$C_1$-$C_8$alkyl" refers to a radical of the formula $R_aOR_b$—, wherein each $R_a$ is independently a $C_1$-$C_6$alkyl radical as generally defined above, and $R_b$ is a $C_1$-$C_6$alkylene radical as generally defined above.

As used herein, the term "di($C_1$-$C_6$alkoxy)$C_1$-$C_8$alkyl" refers to a radical of the formula $(R_aO)_2R_b$—, wherein each $R_a$ is independently a $C_1$-$C_6$alkyl radical as generally defined above, and $R_b$ is a $C_1$-$C_6$alkylene radical as generally defined above.

As used herein, the term "$C_1$-$C_8$alkoxycarbonyl$C_1$-$C_6$alkoxy" refers to a radical of the formula $R_aOC(O)R_bO$—, wherein $R_a$ is a $C_1$-$C_8$alkyl radical as generally defined above, and $R_b$ is a $C_1$-$C_6$alkyl radical as generally defined above.

As used herein, the term "$C_1$-$C_8$alkylcarbonyl$C_1$-$C_6$alkoxy" refers to a radical of the formula $R_aC(O)R_bO$—, wherein $R_a$ is a $C_1$-$C_8$alkyl radical as generally defined above, and $R_b$ is a $C_1$-$C_6$alkyl radical as generally defined above.

As used herein, the term "$C_3$-$C_8$cycloalkyl" refers to a monocyclic ring radical which is saturated or partially unsaturated and contains 3 to 8 carbon atoms. $C_3$-$C_6$cycloalkyl and $C_3$-$C_5$cycloalkyl are to be construed accordingly. Examples of $C_3$-$C_8$cycloalkyl include, but are not limited to cyclopropyl, cyclobutyl, cyclopentyl, cyclopenten-1-yl, cyclopenten-3-yl, and cyclohexen-3-yl.

As used herein, the term "phenyl$C_1$-$C_3$alkyl" refers to a phenyl ring attached to the rest of the molecule by a $C_1$-$C_3$alkyl radical as defined above. Examples of phenyl$C_1$-$C_3$alkyl include, but are not limited to, benzyl.

As used herein, the term "heteroaryl" generally refers to a 5- or 6-membered monocyclic aromatic ring radical which comprises 1 or 2 heteroatoms individually selected from nitrogen, oxygen and sulfur. The heteroaryl radical may be bonded to the rest of the molecule via a carbon atom or heteroatom. Examples of heteroaryl include but are not limited to, furyl, pyrrolyl, thienyl, pyrazolyl, imidazolyl, thiazolyl, oxazolyl, isoxazolyl, pyrazinyl, pyridazinyl, pyrimidyl, and pyridyl.

As used herein, =O means an oxo group, e.g., as found in a carbonyl (—C(=O)—) group.

As used herein, O-mesyl or mesylate refers to a radical of the formula —$OS(O)_2CH_3$.

As used herein, O-tosyl or tosylate refers to a radical of the formula —$OS(O)_2C_6H_4$-p-$CH_3$.

As used herein, O-nosyl or nosylate refers to a radical of the formula —$OS(O)_2C_6H_4$-p-$NO_2$.

As used herein, O-triflyl or triflate refers to a radical of the formula —$OS(O)_2CF_3$.

As used herein, O-trifluoroacetyl or trifluoroacetate refers to a radical of the formula —$OC(O)CF_3$.

As used herein, tetrafluoroborate refers to a radical of the formula $BF_4^-$.

As used herein, tetraphenylborate refers to a radical of the formula $B(C_6H_5)_4^-$.

As used herein, tetrakis(3,5-bis(trifluoromethyl)phenyl) boryl refers to a radical of the formula $B(3,5-(CF_3)_2C_6H_3)_4^-$.

As used herein, hexafluorophosphate refers to a radical of the formula $PF_6^-$.

As used herein, sulfate refers to a radical of the formula $SO_4^{2-}$.

As used herein, hydrogensulfate refers to a radical of the formula $HSO_4^-$.

Some hydroxylamines and hydroxylamine salts of general formula (II) are known to be intermediates of pesticidally active compounds as described in WO10/063700.

Suitable iridium catalysts (IIIa) may be prepared via halogen exchange from known cyclometalated chloro complexes (VI) *Org. Biomol. Chem.*, 2013, 11, 6934; WO 2013/153407 using a suitable metal salt (X-M, wherein X is as defined in (IIIa), and M represents a metal), such as silver mesylate, silver sulfate, silver p-toluenesulfonate. Alternatively, iridium catalysts (IIIa) may be prepared via cyclometallation of iridium complexes (VII) (wherein X is as defined in (IIIa)) and a suitable C,N ligand for example N,1-bis(4-methoxyphenyl)ethanimine. Such reactions are preferably done in non-coordinating or weakly coordinating solvent such as dichloromethane, chloroform, 1,2-dichloroethane ortetrahydrofuran.

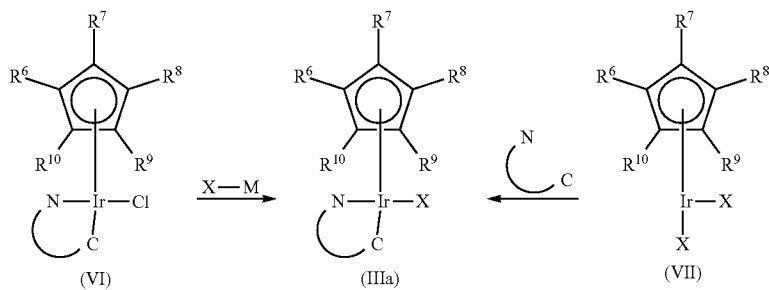

If the catalyst synthesis is carried out in the presence of a coordinating solvent such as a nitrile or water then complexes of structure (IIIb) (Y and Z are as defined above) may be isolated instead.

According to the process of the present invention, the amount of the iridium catalyst is usually between 0.001 mol % and 5 mol %, preferably between 0.01 mol % and 1 mol % based on moles of oxime substrate.

According to the process of the present invention, the hydrogen pressure is usually between 1 and 100 bar, preferably between 5 and 80 bar, more preferably between 7 and 60 bar, and most preferably between 10 and 50 bar.

According to the process of the present invention, the reaction temperature is usually between −20° C. and 120° C., preferably between 0° C. and 100° C., more preferably between 0° C. and 80° C., and even more preferably between 10° C. and 60° C.

The oxime hydrogenation is preferably carried out in the presence of at least a stoichiometric amount of acid. Accordingly the molar amount of the acid should be the same or higher than the amount of oxime substrate to be reduced, for example at least from 1 to 3 molar equivalents, preferably from 1 to 2 molar equivalents, and in particular 1, 1.1 or 2 molar equivalents. The pKa of the acid has to be such that it can at least partly protonate the oxime substrate and the hydroxylamine product. Accordingly, the pKa of the acid is preferably lower than the pKa of the product hydroxylamine salt (II). Suitable acids for most oxime substrates include, but are not limited to methanesulfonic acid, p-toluenesulfonic acid, camphorsulfonic acid, sulfuric acid, trifluoroacetic acid and triflic acid, preferably, methanesulfonic acid, p-toluenesulfonic acid, camphorsulfonic acid, sulfuric acid, and triflic acid. More preferably, the acid is selected from methanesulfonic acid, camphorsulfonic acid and sulfuric acid.

Typically the oxime hydrogenation reaction is carried out in the presence of a solvent, preferred solvents are organic solvents such as alcohols, esters, ethers or hydrocarbons. Preferred solvents are alcohols such as methanol, ethanol, isopropanol, 2-methyl-2-butanol and 2-butanol and ethers such as tetrahydrofuran, 1,2-dimethoxyethane and methyltetrahydrofuran. Most preferred solvents are secondary alcohols such as isopropanol and 2-butanol and ethers such as tetrahydrofuran and methyltetrahydrofuran. Preferably, the solvent is isopropanol.

The present invention also relates to a process for ionic hydrogenation of other unsaturated substrates, for example, acylenamines, imines, enamines, heterocycles, aldehydes and ketones with hydrogen in the presence of an iridium catalyst of formula (IIIa) or formula (IIIb) and optionally an acid.

EXAMPLES

The Examples which follow serve to illustrate the invention.

The following abbreviations are used: s=singlet; bs=broad singlet; d=doublet; br d=broad doublet; dd=double doublet; dt=double triplet; t=triplet; tt=triple triplet, q=quartet, sept=septet; m=multiplet; RT=room temperature, Rt=retention time, MH$^+$=molecular mass of the molecular cation; DCM=dichloromethane.

$^1$H and $^{19}$F NMR spectra were recorded on a Bruker Avance III 400 spectrometer equipped with a BBFOplus probe at 400 MHz/376.6 MHz, respectively.

The following starting materials are commercially available:
Chloro(pentamethylcyclopentadienyl)[(2-pyridinyl-κN) phenyl-κC]iridium(III) (CAS=945491-51-0);
Chloro(pentamethylcyclopentadienyl){5-nitro-2-{1-[(4-methoxyphenyl)imino-κN]ethyl}phenyl-κC}iridium(III) (CAS=1439402-25-1);
7-(2-methoxyethoxy)tetralin-1-one (CAS=1697644-15-7);
methyl 2-(4-oxotetralin-6-yl)oxyacetate (CAS=1937197-95-9);
7-(2-hydroxyethoxy)tetralin-1-one (CAS=1260011-13-9).

Following starting materials were prepared according literature procedures:
Iridium, chloro[5-(ethylmethylamino)-2-(2-pyridinyl-κN) phenyl-κC][(1,2,3,4,5-η)-1,2,3,4,5-pentamethyl-2,4-cyclopentadien-1-yl] (CAS=1379114-67-6), according to Chem. Eur. J. 2012, 18, 6063-6078.
Iridium, chloro[4,5-dimethoxy-2-[1-[(4-methoxyphenyl) imino-κN]ethyl]phenyl-κC][(1,2,3,4,5-η)-1,2,3,4,5-pentamethyl-2,4-cyclopentadien-1-yl] (CAS=1507388-46-6), according to Chem. Eur. J. 2014, 20, 245-252.
Iridium, chloro[(1,2,3,4,5-η)-1,2,3,4,5-pentamethyl-2,4-cyclopentadien-1-yl][5,6,7,8-tetrahydro-3-methoxy-8-[(4-methoxyphenyl)imino-κN]-1-naphthalenyl-κC] (CAS=1469468-10-7), according to SYNLETT 2014, 25, 81-84.
Iridium, chloro[(1,2,3,4,5-η)-1,2,3,4,5-pentamethyl-2,4-cyclopentadien-1-yl][5,6,7,8-tetrahydro-8-[(4-methoxyphenyl)imino-κN]-1-naphthalenyl-κC] (CAS=1469468-08-3), according to SYNLETT 2014, 25, 81-84.
Iridium, chloro[4,5-dimethoxy-2-[1-[(4-methoxyphenyl) imino-κN]ethyl]phenyl-κC][(1,2,3,4,5-η)-1,2,3,4,5-pentamethyl-2,4-cyclopentadien-1-yl] (CAS=1507388-46-6), according to Chem. Eur. J. 2014, 20, 245-252.
Iridium(2+), triaqua[(1,2,3,4,5-η)-1,2,3,4,5-pentamethyl-2,4-cyclopentadien-1-yl]-, sulfate (CAS=254734-81-1), according to WO 2008/093668.

General Procedure 1: Synthesis of N-Aryl Ketimine Ligands of Formula (IV)

The corresponding ketone (1.0 eq.), 4-methoxyaniline (1.1 eq.) and triethylamine (6.0 eq.) and DCM (0.4M) were charged in a dry reaction flask. Titanium tetrachloride (0.6 eq.) solution in DCM (to make the reaction 0.2M overall) was added dropwise at −78° C. The reaction mixture was stirred for 2-80 h. The reaction mixture was quenched with sat. $Na_2CO_3$ solution and the mixture was filtered through a bed of celite. The aqueous layer was extracted with DCM, the organic layers dried with $Na_2SO_4$, filtered and concentrated in vacuum to give a crude product. The crude product was either purified by (a) crystallization with $Et_2O$ or cyclohexane, (b) column chromatography or (c) used as crude.

General Procedure 2: Synthesis of iridium-chloro-Complexes of Formula (VI)

Dichloro(pentamethylcyclopentadienyl)iridium(III)dimer (1.0 eq.), sodium acetate (10.0 eq.) and corresponding ligand (2.2 eq.) were charged in a dry reaction flask. DCM (40 mL/mmol [Ir]) was added under argon, and the reaction mixture stirred at room temperature. After completion of the reaction (conversion monitored by $^1$H-NMR), the reaction mixture was filtered through a plug of Celite® and washed with DCM. The mother liquor was concentrated to dryness to afford the iridium-chloro-complex. For further purification procedures see detailed explanations under each product.

TABLE 1

Ligands prepared according to General Procedure 1:

| Cpd No. | Structure | Comments |
|---|---|---|
| (IV-7) | | (E)-7-(2-methoxyethoxy)-N-(4-methoxyphenyl)tetralin-1-imine<br>51% yield (the crude product purified by column chromatography - silica, ethyl acetate/cyclohexsane/triethylamine)<br>$^1$H NMR (CDCl$_3$): δ 7.87 (d, J = 2.94 Hz, 1H), 7.12 (d, J = 8.4 Hz, 1H), 7.03 (dd, J = 2.57 Hz, 8.44 Hz, 1H), 6.92 (m, 2H), 6.77 (m, 2H), 4.22 (m, 2H), 3.84 (s, 3H), 3.78 (m, 2H), 3.47 (s, 3H), 2.84 (t, J = 5.87, 2H), 2.54 (t, J = 6.24, 2H), 1.90 (m, 2H) ppm.<br>$^{13}$C NMR (CDCl$_3$): δ 165.8, 157.4, 155.8, 144.7, 134.9, 134.1, 129.8, 120.8, 119.6, 114.3, 109.2, 71.1, 67.4, 59.2, 55.5, 29.7, 29.2, 23.3 ppm. |
| (IV-8) | | methyl 2-[(4E)-4-(4-methoxyphenyl)iminotetralin-6-yl]oxyacetate<br>60% yield (crude product 85% NMR purity was used in the next step without further purification)<br>$^1$H NMR (CDCl$_3$): δ 7.83 (d, J = 2.9 Hz, 1H), 7.15 (d, J = 8.4 Hz, 1H), 7.05 (dd, J = 8.1, 2.6 Hz, 1H) 6.95-6.91 (m, 2H), 6.79-6.75 (m, 2H), 4.73 (s, 2H), 3.84 (s, 3H), 3.82 (s, 3H), 2.88-2.82 (m, 2H), 2.54 (m, 2H), 1.93-1.85 (m, 2H) ppm. |
| (IV-9) | | 2-[(4E)-4-(4-methoxyphenyl)iminotetralin-6-yl]oxyethanol<br>14% yield (the crude product was purified by column chromatography - silica, ethyl acetate/cyclohexane/triethylamine)<br>$^1$H NMR (CDCl$_3$): δ 7.87 (d, J = 2.9 Hz, 1H), 7.13 (d, J = 8.8 Hz, 1H), 7.00 (dd, J = 8.4 Hz, J = 2.9 Hz, 1H) 6.95-6.90 (m, 2H), 6.80-6.75 (m, 2H), 4.20-4.16 (m, 2H), 4.00-3.95 (m, 2H), 3.84 (s, 3H), 2.85 (t, J = 6.2 Hz, 2H), 2.55 (t, J = 6.2 Hz, 2H), 1.95-1.85 (m, 2H) ppm.<br>$^{13}$C NMR (CDCl$_3$): δ 165.9, 157.2, 155.9, 144.6, 135.0, 134.3, 129.9, 120.9, 119.2, 114.3, 109.6, 69.4, 61.5, 55.5, 29.7, 29.2, 26.9, 23.3 ppm. |

Example 1: Preparation of (N,1,1-tris(4-methoxyphenyl)methanimine iridium chloro Complex (VI-1)

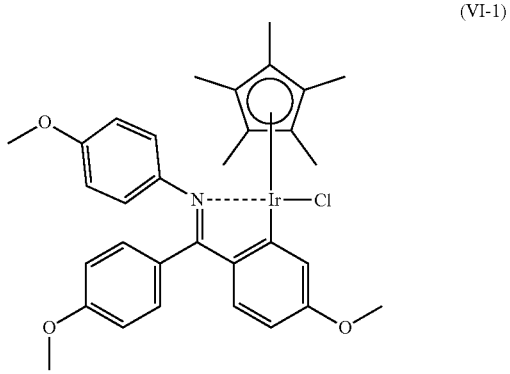

(VI-1)

A one-necked round bottom flask, equipped with a magnetic stirrer bar and a condenser, was charged with 4-methoxyaniline (0.598 g), bis(4-methoxyphenyl)methanone (1.00 g), molecular sieves and toluene (8.0 mL), and the reaction mixture stirred at reflux for 24 h. The reaction mixture was cooled to RT and filtered through filter paper. The resulting filtrate was reduced under vacuum to afford N,1,1-tris(4-methoxyphenyl)methanimine.

A one-necked round bottom flask, equipped with a magnetic stirrer bar, was charged with N,1,1-tris(4-methoxyphenyl)methanimine (324 mg), DCM (4.3 mL), dichloro(pentamethylcyclopentadienyl)-iridium(III)dimer (300 mg), and sodium acetate (150.0 mg), and the reaction mixture stirred at reflux for 3 h. Another portion of N,1,1-tris(4-methoxyphenyl)methanimine (100 mg) was added and the mixture was stirred for a further 30 min at reflux. The reaction mixture was then filtered through a pad of silica and the filtrate reduced under vacuum. The resultant solid was dissolved in boiling dichloroethane (5 mL), and MeOH (15 mL) was added. The mixture was left overnight in a freezer (−22° C.), and the resultant crystals were isolated by decantation, washed with MeOH and dried under vacuum to afford 361 mg of the title compound (VI-1), as red crystals.

$^1$H NMR (CDCl$_3$) δ=7.38 (d, J=2.6 Hz, 1H), 6.57-7.36 (m, 9H), 6.49 (dd, J=8.4 Hz, J=2.6 Hz, 1H), 3.90 (s, 3H), 3.77 (s, 3H), 3.75 (s, 3H), 1.47 (s, 15H) ppm.

TABLE 2

Iridium-chloro-complexes of formula (VI) prepared according to General Procedure 2:

| Cpd No. | Structure | Comments |
|---|---|---|
| (VI-2) |  | 87% yield (crude product triturated with Et$_2$O/n-Hexane = 1:2)<br>$^1$H NMR (CDCl$_3$) δ 7.83 (d, J = 8.8 Hz, 1H), 7.48 (d, J = 8.4 Hz, 1H), 7.36 (d, J = 2.6 Hz, 1H), 6.79-6.84 (m, 1H), 6.73-6.77 (m, 1H), 6.60 (dd, J = 8.4 Hz, J = 2.6 Hz, 1H), 3.91 (s, 3H), 3.84 (s, 3H), 2.30 (s, 3H), 2.05 (s, 3H), 1.46 (s, 15) ppm.<br>$^{13}$C NMR (CDCl$_3$) δ 180.5, 168.9, 161.9, 157.3, 143.3, 141.6, 131.0, 130.0, 125.3, 119.2, 114.1, 112.5, 107.7, 89.4, 55.5, 55.0, 18.0, 16.8, 8.8 ppm. |
| (VI-3) |  | 80% yield (solid washed with Et$_2$O)<br>$^1$H NMR (CDCl$_3$) δ 7.81 (m, 1H), 7.65 (bs, 1H), 7.30 (bs, 1H), 7.21 (d, J = 8.4 Hz, 1H), 6.57 (dd, J = 8.4 Hz, J = 1.5 Hz, 1H), 6.49 (bs, 1H), 3.86 (s, 3H), 1.75 (s, 15H) ppm.<br>$^{13}$C NMR (CDCl$_3$) δ 158.2, 147.3, 137.3, 136.9, 124.4, 121.8, 111.2, 107.7, 107.7, 88.1, 55.4, 9.0 ppm. |

TABLE 2-continued

Iridium-chloro-complexes of formula (VI) prepared according to General Procedure 2:

| Cpd No. | Structure | Comments |
|---|---|---|
| (VI-4) | 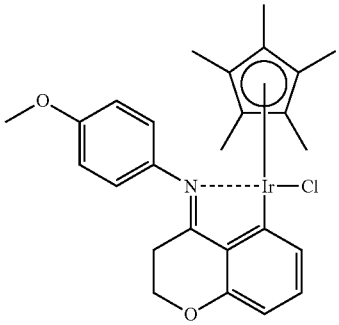 | 67% yield (crude product was purified via filtration over a pad of silica eluted with DCM and via trituration with Et$_2$O/n-pentane = 1:2)<br>$^1$H NMR (CDCl$_3$) δ 7.29-7.38 (m, 3H), 7.12-7.19 (m, 1H), 6.89-7.96 (m, 2H), 6.43-6.51 (m, 1H), 4.20-4.30 (m, 1H), 4.10-4.18 (m, 1H), 3.85 (s, 3H), 3.13-3.26 (m, 1H), 2.67-2.81 (m, 1H), 1.46 (s, 15H) ppm. |
| (VI-5) | 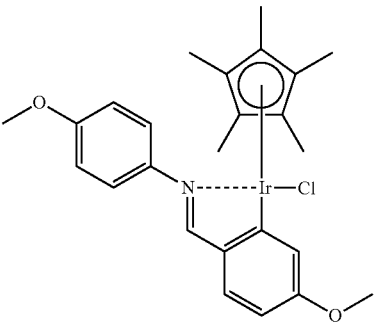 | 47% yield (the cyclometalation reaction was done in presence of 4-methoxybenzaldehyde additive (1 eq.). The crude product was purified by column chromatography (silica, ethyl acetate - cyclohexane gradient) followed by crystallization from dichloromethane-Et$_2$O-pentane)<br>$^1$H NMR (CDCl$_3$) δ 8.15 (s, 1H), 7.55 (d, J = 8.4 Hz, 1H), 7.48-7.52 (m, 2H), 7.35-7.37 (m, 1H), 6.86-6.92 (m, 2H), 6.59 (dd, J = 8.4 Hz, J = 2.6 Hz, 1H), 3.91 (s, 3H), 3.84 (s, 3H), 1.49 (s, 15H) ppm. |
| (VI-6) | 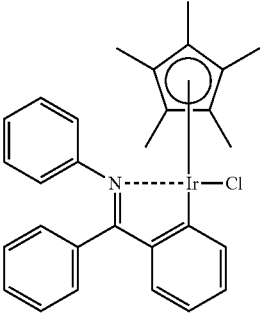 | 84% yield (the crude product purified by column chromatography - silica, ethyl acetate/cyclohexane gradient and trituration using n-pentane)<br>$^1$H NMR (acetone-d6) δ 7.90 (dd, J = 7.7 Hz, J = 1 Hz, 1H), 6.88-7.61 (m, 12H), 6.82 (br d, J = 7.7 Hz, 1H), 1.48 (s, 15H) ppm. |
| (VI-7) | 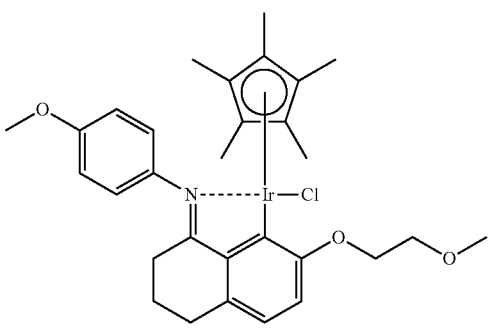 | 80% yield (the crude product was purified via trituration with diethyl ether/n-hexane = 1:4)<br>$^1$H NMR (CDCl$_3$) δ 7.57-7.23 (m, 2H), 6.95 (d, J = 9.2 Hz, 2H), 6.82 (dd, J = 21.3 Hz, J = 8.1 Hz, 2H), 4.23 (m, 2H), 3.87 (s, 3H), 3.81-3.66 (m, 2H), 3.45 (s, 3H), 3.05-2.83 (m, 2H), 2.78-2.61 (m, 2H), 1.91-1.80 (m, 2H), 1.47 (s, 15H) ppm. |

TABLE 2-continued

Iridium-chloro-complexes of formula (VI) prepared according to General Procedure 2:

| Cpd No. | Structure | Comments |
|---|---|---|
| (VI-8) | | 21% yield (the crude product purified by column chromatography on silica, dichloromethane/methanol gradient) $^1$H NMR (CDCl$_3$) δ 7.65-7.13 (m, 2H), 6.99-6.92 (m, 2H), 6.80-6.72 (m, 2H), 4.83 (d, J = 17.2 Hz, 1H), 4.55 (d, J = 16.9 Hz, 1H), 3.87 (s, 3H), 3.81 (s, 3H), 3.07-2.96 (m, 1H), 2.90-2.81 (m, 1H), 2.79-2.70 (m, 1H), 2.69-2.61 (m, 1H), 1.93-1.76 (m, 2H), 1.47 (s, 15H) ppm. |
| (VI-9) | | 82% yield (the crude product was purified via trituration with diethyl ether) $^1$H NMR (CDCl$_3$) δ 7.30-7.50 (m, 2H), 6.95 (dd, J = 7.70, 1.5 Hz, 2H), 6.78 (dd, J = 9.9 Hz, J = 8.07 Hz, 2H), 4.52-4.45 (m, 1H), 4.28-4.20 (m, 1H), 3.87 (s, 3H), 3.83-3.73 (m, 2H), 3.09-2.97 (m, 1H), 2.94-2.83 (m, 1H), 2.79-2.60 (m, 2H), 1.96-1.76 (m, 2H), 1.46 (s, 15H) ppm. |

General Procedure 3: For Synthesis of iridium-mesylate-Complexes of Formula (III)

A reaction flask was charged with iridium-chloro-complex (1.0 eq.) and silver mesylate (1.1 eq.) under argon, and the reaction flask wrapped with aluminium foil (silver mesylate is light-sensitive). CDCl$_3$ (2.5 mL/mmol) was added and the reaction mixture was stirred under argon for 20 h. The reaction mixture was diluted with CDCl$_3$ and filtered through a syringe filter (0.22 μm). The filtrate was concentrated under reduced pressure to provide the iridium-mesylate-complexes. For further purification procedures see detailed explanations under each product.

Example 2: Preparation of (E)-4-methoxy-N-(1-(4-methoxyphenyl)ethylidene)aniline iridium mesylate Complex (III-1)

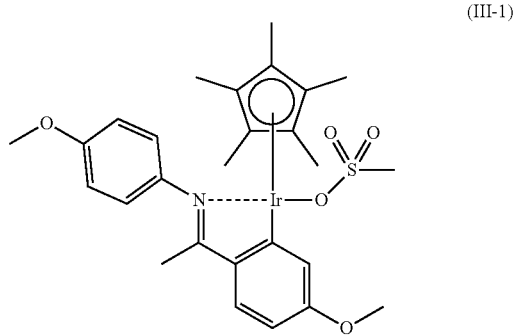

(III-1)

A reaction flask was charged with (E)-4-methoxy-N-(1-(4-methoxyphenyl)ethylidene)aniline iridium chloride complex (400 mg, CAS=1258964-48-5) and silver mesylate (136 mg) under argon, and the reaction flask wrapped with aluminium foil (silver mesylate is light-sensitive). CDCl$_3$ (2 mL) was added and the reaction mixture was stirred under argon for 20 h. The reaction mixture was diluted with a further portion of CDCl$_3$ (2 mL) and filtered through a syringe filter (0.22 μm). The filtrate was concentrated under reduced pressure to provide the title compound (III-1, 401 mg) as a yellow solid.

$^1$H NMR (CDCl$_3$) δ 7.70 (bd, J=2.6 Hz, 1H), 7.46 (d, J=8.4 Hz, 1H), 6.98 (bs, 4H), 6.63 (dd, J=8.4 Hz, J=2.6 Hz, 1H), 3.94 (s, 3H), 3.86 (s, 3H), 2.32 (s, 3H), 1.78 (s, 3H), 1.42 (s, 15H) ppm.

$^{13}$C NMR (CDCl$_3$) δ 182.2, 168.8, 162.3, 157.8, 143.4, 142.8, 129.8, 121.0, 108.5, 88.3, 55.5, 55.3, 39.1, 16.7, 8.8 ppm. Two carbon signals not observed due to signal broadening.

TABLE 3

Iridium-mesylate complexes of formula (III) prepared according to General Procedure 3:

| Cpd No. | Structure | Comments |
|---|---|---|
| (III-2) | | 91% yield<br>$^1$H NMR (CDCl$_3$) δ 8.99 (d, J = 5.1 Hz, 1H), 8.13 (d, J = 7.3 Hz, 1H), 7.73-7.87 (m, 2H), 7.69 (dd, J = 7.7 Hz, J = 1.1 Hz, 1H), 7.25-7.30 (m, 1H), 7.21 (td, J = 6.4 Hz, J = 1.5 Hz, 1H), 7.11 (td, J = 7.5 Hz, J = 1.1 Hz, 1H), 1.76 (bs, 3H), 1.69 (s, 15H) ppm. |
| (III-3) | | Quantitative yield<br>$^1$H NMR (CDCl$_3$) δ 8.93 (d, J = 5.9 Hz, 1H), 7.60-7.72 (m, 4H), 7.07-7.15 (m, 1H), 6.67 (dd, J = 8.4 Hz, J = 2.6 Hz, 1H), 3.93 (s, 3H), 1.82 (bs, 3H), 1.68 (s, 15H) ppm. |
| (III-4) | | 98% yield<br>$^1$H NMR (CDCl$_3$) δ 7.93 (s, 1H), 7.87 (bs, 1H), 7.59 (bs, 1H), 7.25 (d, J = 8.4 Hz, 1H), 6.60-6.68 (m, 1H), 6.57 (bs, 1H), 3.89 (s, 3H), 1.74 (s, 15H) ppm. One proton signal not observed due to signal broadening.<br>$^{13}$C NMR (CDCl$_3$) δ 158.3, 147.9, 139.0, 137.8, 124.5, 122.4, 111.1, 108.7, 108.1, 87.5, 55.5, 39.2, 9.4 ppm. |

TABLE 3-continued

Iridium-mesylate complexes of formula (III) prepared according to General Procedure 3:

| Cpd No. | Structure | Comments |
| --- | --- | --- |
| (III-5) | | 72% yield<br>$^1$H NMR (CDCl$_3$) δ 8.91 (d, J = 2.6 Hz, 1H), 7.93 (dd, J = 8.4 Hz, J = 2.2 Hz, 1H), 7.63 (d, J = 8.4 Hz, 1H), 6.95-7.30 (bm, 4H), 3.89 (s, 3H), 2.46 (s, 3H), 1.97 (s, 3H), 1.45 (s, 15H) ppm. |
| (III-6) | | Quantitative yield<br>$^1$H NMR (CDCl$_3$) δ 7.65 (s, 1H), 6.9-7.1 (m, 3H), 4.60 (s, 3H), 3.88 (s, 3H), 3.85 (s, 3H), 2.34 (s, 3H), 1.75 (bs, 3H), 1.42 (s, 15H) ppm. Signals of two protons not observed due to signal broadening. |
| (III-7) | | Quantitative yield<br>$^1$H NMR (CDCl$_3$) δ 7.51 (bs, 1H), 6.96 (bd, 2H), 6.39 (bs, 1H), 3.90 (s, 3H), 3.85 (s, 3H), 1.60-2.90 (m, 9H), 1.42 (s, 15H) ppm. Signals of two protons not observed due to signal broadening. |
| (III-8) | | 90% yield (crude product triturated with pentane)<br>$^1$H NMR (CDCl$_3$) δ 7.61-7.70 (m, 1H), 7.24-7.29 (m, 3H), 6.91-7.02 (m, 2H), 6.50-6.60 (m, 1H), 4.22-4.34 (m, 1H), 3.98-4.11 (m, 1H), 3.86 (s, 3H), 3.02-3.21 (m, 1H), 2.63-2.76 (m, 1H), 1.83 (s, 3H), 1.44 (s, 15H) ppm. |

TABLE 3-continued

Iridium-mesylate complexes of formula (III) prepared according to General Procedure 3:

| Cpd No. | Structure | Comments |
|---|---|---|
| (III-9) | | 84% yield (the crude product dissolved in CDCl$_3$ and filtered through a short pad of silica, evaporated and recrystallized from a minimum amount of dichloromethane-pentane)<br>$^1$H NMR (CDCl$_3$) δ 8.20 (s, 1H), 7.72 (d, J = 2.4 Hz, 1H), 7.53 (d, J = 8.4 Hz, 1H), 7.40-7.45 (m, 2H), 6.92-6.97 (m, 2H), 6.63 (dd, J = 8.4 Hz, J = 2.4 Hz, 1H), 3.94 (s, 3H), 3.86 (s, 3H), 1.87 (s, 3H), 1.47 (s, 15H) ppm. |
| (III-10) | | 98% yield (the crude product was dissolved in CDCl$_3$ and filtered through a short pad of silica, evaporated and the solid residue triturated using pentane)<br>$^1$H NMR (CDCl$_3$) δ 8.24 (d, J = 7.7 Hz, 1H), 7.43 (br d, J = 4.0 Hz, 2H), 6.95-7.35 (m, 10H), 6.85 (br d, J = 7.7 Hz, 1H), 1.71 (s, 3H), 1.45 (s, 15H) ppm. |
| (III-11) | | 91% yield (the crude product was dissolved in CDCl$_3$ and filtered through a short pad of silica, evaporated and the solid residue triturated using pentane)<br>$^1$H NMR (CDCl$_3$) δ 7.75 (d, J = 2.2 Hz, 1H), 6.60-7.40 (m, 9H), 6.52 (dd, J = 7.6 Hz, J = 2.4 Hz, 1H), 3.93 (s, 3H), 3.78 (s, 3H), 3.76 (s, 3H), 1.78 (s, 3H), 1.45 (s, 15H) ppm. |
| (III-12) | | Quantitative yield<br>$^1$H NMR (CDCl) δ 7.66 (bs, 1H), 7.40-7.64 (m, 2H), 6.25-6.90 (m, 2H), 6.64 (m, 1H), 3.94 (s, 3H), 3.85 (s, 3H), 2.22 (s, 3H), 2.08 (bs, 3H), 1.43 (s, 15H) ppm.<br>Signal of three protons not observed due to signal broadening. |

TABLE 3-continued

Iridium-mesylate complexes of formula (III) prepared according to General Procedure 3:

| Cpd No. | Structure | Comments |
|---|---|---|
| (III-13) | | 86% yield (triturated using diethylether and n-pentane)<br>$^1$H NMR (CDCl$_3$) δ 9.25 (d, J = 4.8 Hz, 1H), 8.36 (d, J = 7.0 Hz, 1H), 8.25 (dd, J = 7.1 Hz, J = 1 Hz, 1H), 7.80-7.88 (m, 1H), 7.55-7.70 (m, 4H), 1.75 (s, 15H), 1.36 (bs, 3H) ppm. |
| (III-17) | | Quantitative yield<br>$^1$H NMR (CD$_3$CN) δ 7.22-7.17 (m, 2H), 7.08-7.03 (m, 2H), 6.94 (d, J = 8.1 Hz, 1H), 6.88 (d, J = 8.1 Hz, 1H), 4.29-4.21 (m, 1H), 4.17-4.11 (m, 1H), 3.87 (s, 3H), 3.79-3.74 (m, 2H), 3.38 (s, 3H), 3.22-3.11 (m, 1H), 2.95-2.83 (m, 1H), 2.79-2.70 (m, 1H), 2.68-2.58 (m, 1H), 2.55-2.22 (brs, 2H), 2.47 (s, 3H), 1.74-1.60 (m, 2H), 1.49 (s, 15H) ppm. |
| (III-18) | | 51% yield (triturated using diethylether)<br>$^1$H NMR (CDCl$_3$) δ 7.73-7.11 (br m, 2H), 7.45-6.97 (bm, 2H), 6.86-6.79 (m, 2H), 6.62 (d, J = 8.1 Hz, 1H), 5.02-4.80 (bm, 1H), 4.75-4.57 (bm, 1H), 3.88 (s, 3H), 3.85 (s, 3H), 2.95-2.54 (m, 4H), 1.93 (bs, 3H), 1.80-1.55 (s, 2H), 1.45 (s, 15H) ppm. |
| (III-19) | | 82% yield<br>$^1$H NMR (CD$_3$CN) δ 7.47-7.12 (m, 2H), 7.00 (d, J = 9.2 Hz, 1H), 6.84 (d, J = 8.1 Hz, 1H), 6.75 (d, J = 8.4 Hz, 1H), 4.82-4.70 (m, 1H), 4.49-4.28 (m, 2H), 4.06-3.91 (m, 2H), 3.88 (s, 3H), 2.96-2.59 (m, 4H), 1.92 (s, 3H), 1.76-1.56 (m, 2H), 1.44 (s, 15H) ppm. |

Example 3: Preparation of (E)-4-methoxy-N-(1-(4-methoxyphenyl)ethylidene)aniline iridium sulfate Complex (III-14)

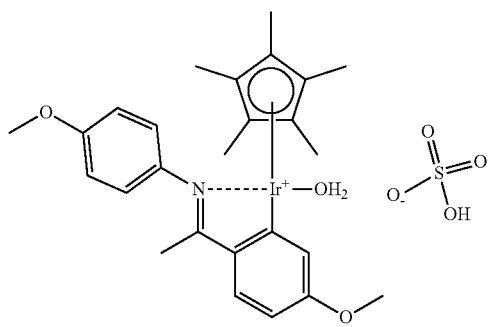

(III-14)

A reaction vial was charged with pentamethylcyclopentadienyl iridium sulfate complex (143 mg, CAS=[254734-81-1]), (E)-N,1-bis(4-methoxyphenyl)ethanimine (76 mg) and CD$_3$OD (1.2 mL) under argon. The reaction vial was stirred overnight. $^1$H NMR analysis of the reaction mixture revealed formation of the cyclometalated iridium complex in 73% NMR yield.

$^1$H NMR (CDCl$_3$) δ 7.65 (d, J=8.4 Hz, 1H), 7.57 (d, J=2.2 Hz, 1H), 6.77 (dd, J=8.4 Hz, J=2.2 Hz, 1H), 3.94 (s, 3H), 3.87 (s, 3H), 2.42 (s, 3H), 1.42 (s, 15H) ppm. Signal of four protons not observed due to signal broadening.

Example 4: Preparation of (E)-4-methoxy-N-(1-(4-methoxyphenyl)ethylidene)aniline iridium (acetonitrile) tetrafluoroborate Complex (III-15)

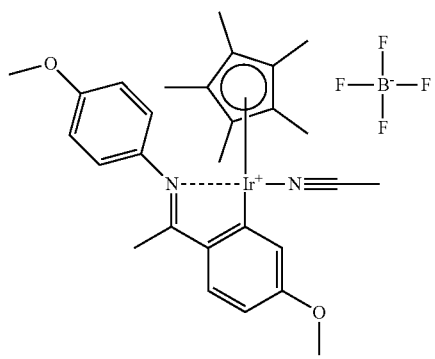

(III-15)

A reaction vial was charged with (E)-4-methoxy-N-(1-(4-methoxyphenyl)ethylidene)aniline iridium chloride complex (250 mg, CAS=1258964-48-5), sodium tetrafluoroborate (89 mg), and acetonitrile (1.6 mL). The reaction mixture was stirred at RT for 48 h and filtered through a pad of celite (washed with DCM). The filtrate was concentrated under vacuum and the solid residue was triturated using diethylether providing 246 mg of the title compound as a yellow solid.

$^1$H NMR (CDCl$_3$) δ 7.52 (d, J=8.4 Hz, 1H), 7.27 (d, J=2.4 Hz, 1H), 7.00-7.20 (bs, 4H), 6.72 (dd, J=8.4 Hz, J=2.4 Hz, 1H), 3.94 (s, 3H), 3.88 (s, 3H), 2.60 (s, 3H), 2.42 (s, 3H), 1.49 (s, 15H) ppm.

Example 5: Preparation of (E)-4-methoxy-N-(1-(4-methoxyphenyl)ethylidene)aniline iridium trifluoroacetate Complex (III-16)

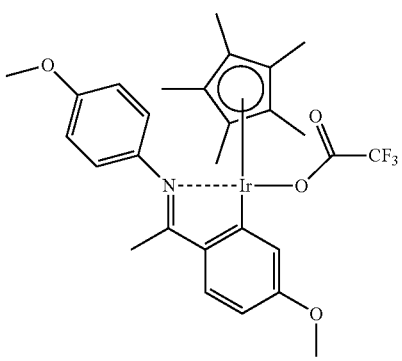

(III-16)

A reaction vial was charged with (E)-4-methoxy-N-(1-(4-methoxyphenyl)ethylidene)aniline iridium chloride complex (250 mg, CAS=1258964-48-5), silver trifluoroacetate (107 mg) and CDCl$_3$ (1.0 mL). The reaction mixture was stirred at RT for 20 h and filtered through a pad of celite (washed with dichloromethane). The filtrate was concentrated and purified by column chromatography (silica, ethylacetate-cyclohexane gradient). The isolated solid was dissolved in a minimal amount of dichloromethane and diluted with n-pentane. The product crystallised in a freezer overnight. The product was recovered by decantation, washed with n-pentane and dried under vacuum to afford 129 mg of the title compound as a yellow solid.

$^1$H NMR (CDCl$_3$) δ 7.66 (d, J=2.2 Hz, 1H), 7.40 (d, J=8.4 Hz, 1H), 6.09-7.10 (bm, 2H), 6.55-6.65 (m, 1H), 3.91 (s, 3H), 3.87 (s, 3H), 2.29 (s, 3H), 1.43 (s, 15H) ppm. Signals of two protons not observed due to signal broadening.

Examples 6: Synthesis of Hydroxylamine (II-1) Via Oxime Hydrogenation

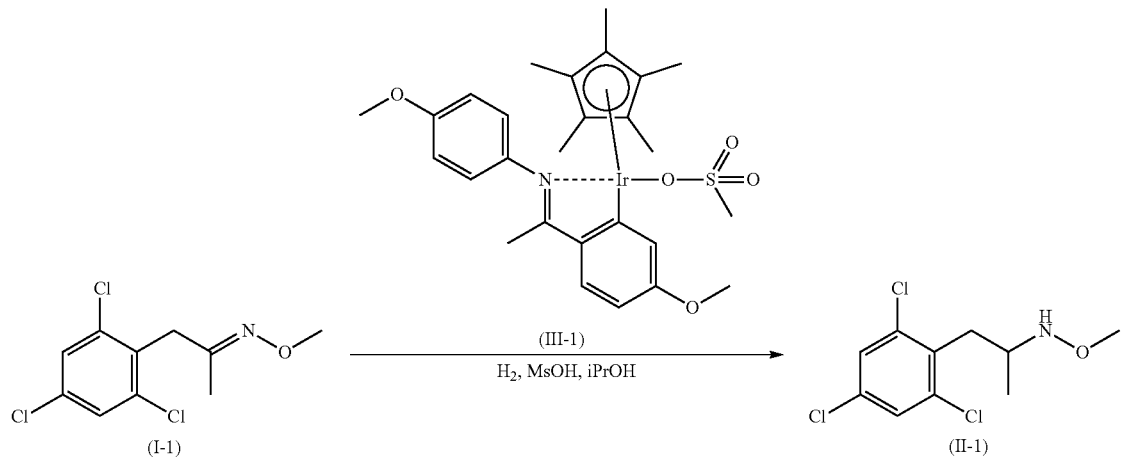

A 100 mL Hastelloy reactor was charged with (E)-N-methoxy-1-(2,4,6-trichlorophenyl)propan-2-imine (2.00 g, 99:1=E/Z, 95% NMR purity) and catalyst (III-1) (5.0 mg) as a solid, the reactor was closed and flushed with argon. iPrOH (10 mL, anhydrous, degassed with argon) and methanesulfonic acid (0.72 mL) were added to the reactor under argon, and the reactor was purged with hydrogen (3×5 bar), pressurized to 50 bar $H_2$ and stirred overnight at 23° C. Hydrogen was released and the reactor was again purged with argon. GC and NMR analysis of the crude reaction mixture indicated full conversion. The reaction mixture was added slowly onto sat. $NaHCO_3$ solution (15 mL) and water (10 mL), and extracted with dichloromethane (2×15 mL). The combined organic layers were dried with $Na_2SO_4$, filtered and evaporated to give 1.97 g (97% NMR purity) of the desired product (II-1).

Example 7: Synthesis of Hydroxylamine (II-1) Via Oxime Hydrogenation, Various Conditions

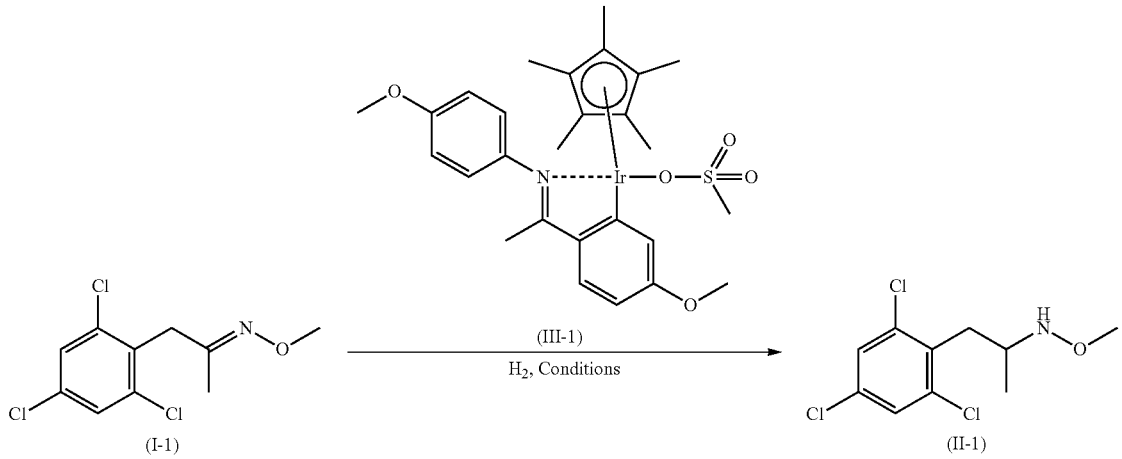

Conditions: catalyst III-1, 1.5 eq methanesulfonic acid, iPrOH solvent (200 g substrate/1 L solvent) unless otherwise indicated.

TABLE 4

Conditions and outcome of reactions according to Example 7

| Conditions | Outcome |
|---|---|
| 0.1 mol % cat., 50 bar $H_2$, 50° C., 2 h | 100% conv. (>95% NMR yield, 2 g scale) |
| 0.1 mol % cat., 50 bar $H_2$, RT, 16 h | 100% conv. |
| 0.1 mol % cat., 50 bar $H_2$, 10° C., 16 h | 100% conv. |
| 0.05 mol % cat., 30 bar $H_2$, RT, 15 h | 100% conv. |
| 0.05 mol % cat., 20 bar $H_2$, RT, 15 h | 100% conv. |
| 0.1 mol % cat., 10 bar $H_2$, RT, 15 h | 100% conv. |
| 0.1 mol % cat., 50 bar $H_2$, RT, 3 equivalents of methanesulfonic acid, 16 h | 100% conv. |
| 0.1 mol % cat., 50 bar $H_2$, RT, 1 equivalent $H_2SO_4$, 16 h | 97% conv. |
| 0.1 mol % cat., 50 bar $H_2$, RT, 1.5 equivalent (+)-camphorsulfonic acid, 16 h | 96% conv. |
| 0.01 mol % cat 50 bar $H_2$, RT, 91 h | 76% conv. |
| 1 mol % cat., 1.5 equivalents (+)-camphorsulfonic acid, THF, 50 bar Hz, 60° C., 24 h | 90% conv. |

In all reactions gave high selectivity (>95%) towards the desired product.

Example 8: Synthesis of Hydroxylamine (II-1) Via Oxime Hydrogenation Using Various Catalysts

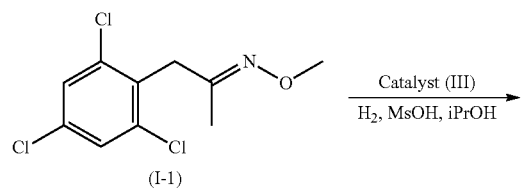

Conditions: 1.5 eq methanesulfonic acid, iPrOH solvent (200 g substrate/1 L solvent), 0.1 mol % catalyst, 30 bar $H_2$, RT, 16 h, unless otherwise indicated.

TABLE 5

Conditions and outcome of reactions according to Example 8

| Catalyst | Reaction Time (h) | Outcome (% Conversion) |
|---|---|---|
| (III-8) | 16 | 100 |
| (III-9) | 16 | 99 |
| (III-10) | 16 | 100 |
| 0.01 mol % (III-11), 91 h | 91 | 76 |
| 1 mol % (III-13) | 16 | 90 |
| (III-15) | 16 | 75 |
| (III-16) | 16 | 100 |
| 0.1 mol % (III-17), 3 h | 3 | 97 |
| 0.025 mol % (III-17), 3 h | 3 | 91 |
| 0.1 mol % (III-18), 3 h | 3 | 100 |
| 0.025 mol % (III-18), 3 h | 3 | 95 |
| 0.1 mol % (III-19), 3 h | 3 | 97 |
| 0.025 mol % (III-19), 3 h | 3 | 74 |

In all reactions high selectivity towards the desired product (>95%) was observed.

Example 9: Synthesis of Hydroxylamines (II) Via Oxime Hydrogenation, Substrate Scope

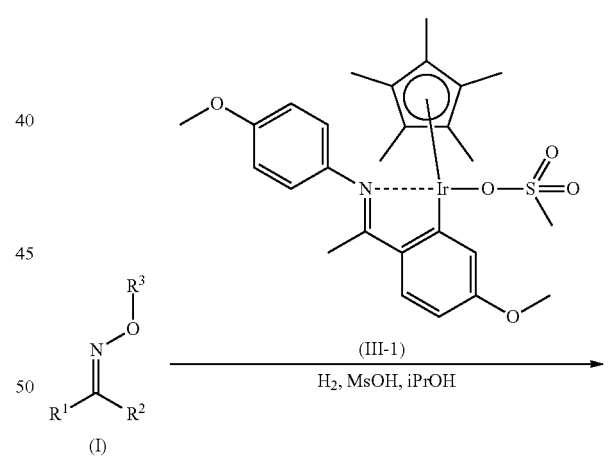

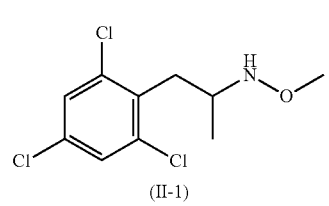

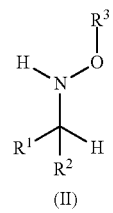

Conditions: 1.5 eq methanesulfonic acid, iPrOH solvent, 1 mol % catalyst ill-1, 50 bar $H_2$, RT, 16 h

TABLE 6

Hydroxylamine products (II) prepared according to Example 9:

| Cpd No. | Structure | Comments |
|---|---|---|
| (II-2) | | N-methoxy-1-(4-methoxyphenyl)ethanamine<br>Quantitative yield<br>$^1$H NMR (400 MHz, CDCl$_3$): δ 7.26 (d, 2H, J = 8.8 Hz), 6.86 (d, 2H, J = 8.4 Hz), 5.56 (d, 1H, J = 5.1 Hz), 4.19 (q, 1H, J = 6.2 Hz), 3.79 (s, 3H), 3.47 (s, 3H), 1.34 (d, 3H, J = 6.6 Hz) ppm.<br>$^{13}$C NMR (400 MHz, CDCl$_3$): δ 158.94, 134.86, 128.22, 113.81, 62.51, 59.85, 55.28, 19.84 ppm.<br>LCMS: Mass = 181, R$_t$ = 4.29 |
| (II-3) | | N-benzyloxy-1-(4-methoxyphenyl)ethanamine<br>89% yield<br>$^1$H NMR (400 MHz, CDCl$_3$): δ 7.24-7.32 (m, 7H), 6.85 (d, 2H, J = 8.4 Hz), 5.56 (bs 1H), 4.57-4.66 (m, 2H), 4.11 (q, 1H, J = 6.6 Hz), 3.78 (s, 3H), 1.33 (d, 3H, J = 6.6 Hz) ppm.<br>$^{13}$C NMR (400 MHz, CDCl$_3$): δ 159.00, 137.99, 134.96, 128.53, 128.41, 127.81, 113.81, 60.02, 55.32, 19.96 ppm.<br>LCMS: Mass = 258, R$_t$ = 7.43 |
| (II-4) | | N-isopropoxy-1-(4-methoxyphenyl)ethanamine<br>90% yield<br>$^1$H NMR (400 MHz, CDCl$_3$): δ 7.18 (d, 2H, J = 8.4 Hz), 6.77 (d, 2H, J = 8.4 Hz), 5.20 (bs, 1H), 3.97 (q, 1H, J = 6.4 Hz), 3.71 (s, 3H), 3.60-3.75 (m, 1H), 1.27 (d, 3H, J = 6.5 Hz), 1.05 (d, J = 6.2 Hz, 3H), 0.96 (d, J = 6.2 Hz, 3H) ppm. |
| (II-5) | | N-tert-butoxy-1-(4-methoxyphenyl)ethanamine<br>Quantitative yield, reaction, conducted at 50° C.<br>$^1$H NMR (400 MHz, CDCl$_3$): δ 7.17 (d, 2H, J = 8.4 Hz), 6.77 (d, 2H, J = 8.4 Hz), 4.78 (bs, 1H), 3.90 (q, 1H, J = 6.4 Hz), 3.71 (s, 3H), 1.27 (d, 3H, J = 6.5 Hz) ppm.<br>$^{13}$C NMR (400 MHz, CDCl$_3$): δ 158.86, 135.11, 128.58, 127.13, 113.60, 59.75, 55.24, 26.91, 19.84 ppm.<br>LCMS: Mass = 223, R$_t$ = 5.32 |
| (II-6) | | N-allyloxy-1-(4-methoxyphenyl)ethanamine<br>49% yield, product isolated by column chromatography<br>$^1$H NMR (400 MHz, CDCl$_3$): δ 7.23 (d, 2H, J = 8.8 Hz), 6.85 (d, 2H, J = 8.4 Hz), 5.95 (ddt, 1H, J$_1$ = 16.8 Hz, J$_2$ = 10.5 Hz, J$_3$ = 6.6 Hz), 5.11-5.15 (m, 2H), 3.78-3.83 (m, 4H), 3.26-3.31 (m, 1H), 3.16 (d, 1H, J = 5.9 Hz), 1.46 (d, 3H, J = 6.6 Hz) ppm.<br>$^{13}$C NMR (400 MHz, CDCl$_3$): δ 158.90, 134.36, 129.21, 118.35, 113.76, 65.49, 59.88, 55.27, 19.53 ppm.<br>LCMS: Mass = 207, R$_t$ = 5.65 |
| (II-7) | | N-[1-(4-methoxyphenyl)ethyl]hydroxylamine<br>77% yield, reaction done at 50° C.<br>The product analytical data are in agreement with the literature: Org. Proc. Res. Dev. 2009, 13, 49-53. |

TABLE 6-continued

Hydroxylamine products (II) prepared according to Example 9:

| Cpd No. | Structure | Comments |
|---|---|---|
| (II-8) | [structure] | N-methoxy-1-(4-methoxyphenyl)methanamine<br>88% yield<br>The product analytical data are in agreement with the literature: *Heterocycles* 2009, 78, 463-470. |
| (II-9) | [structure] | 1-(3-chlorophenyl)-N-methoxy-propan-1-amine<br>62% yield<br>$^1$H NMR (400 MHz, CDCl$_3$): δ 7.33 (s, 1H), 7.19-7.25 (m, 3H), 5.68 (bs, 1H), 3.84 (bs, 1H), 3.43 (s, 3H), 1.73-1.83 (m, 1H), 1.53-1.63 (m, 1H), 0.82 (t, 3H, J = 7.5 Hz)<br>$^{13}$C NMR (400 MHz, CDCl$_3$): δ 144.10, 134.19, 129.55, 127.78, 127.53, 125.94, 66.90, 62.49, 26.67, 10.51<br>LCMS: Mass = 199, R$_t$ = 4.30 |
| (II-10) | [structure] | N-methoxy-1-(4-nitrophenyl)ethanamine<br>94% yield<br>$^1$H NMR (400 MHz, CDCl$_3$): δ 8.12 (d, 2H, J = 8.5 Hz), 7.47 (d, 2H, J = 8.5 Hz), 5.15 (bs, 1H), 4.18 (q, 1H, J = 6.6 Hz), 3.35 (s, 3H), 1.26 (d, 3H, J = 6.6 Hz) ppm. |
| (II-11) | [structure] | N-methoxy-1-(o-tolyl)ethanamine<br>48% yield<br>$^1$H NMR (400 MHz, CDCl$_3$): δ 7.33-7.38 (m, 1H), 7.05-7.18 (m, 4H), 5.51 (bs, 1H), 4.30-4.38 (m, 1H), 3.44 (s, 3H), 2.30 (s, 3H), 1.26 (d, J = 6.6 Hz, 3H) ppm. |
| (II-12) | [structure] | N-methoxy-1-(4-methoxyphenyl)propan-2-amine<br>80% yield<br>$^1$H NMR (400 MHz, CDCl$_3$): δ = 7.11 (d, 2H, J = 8.5 Hz), 6.84 (d, 2H, J = 8.5 Hz), 5.5 (bs, 1H), 3.79 (s, 3H), 3.56 (s, 3H), 3.13-3.25 (m, 1H), 2.70-2.80 (m, 1H), 2.50-2.62 (m, 1H), 1.08 (d, J = 6.6 Hz, 3H) ppm. |
| (II-13) | [structure] | methyl 2-(methoxyamino)propanoate<br>77% yield, isolated as mesylate salt<br>The product analytical data are in agreement with the literature values: WO2015/052076 |
| (II-14) | [structure] | N-(2,2-dimethoxy-1-methyl-ethyl)hydroxylamine<br>70% yield<br>$^1$H NMR (400 MHz, CDCl$_3$): δ 5.90 (br s, 1H), 4.32 (d, J = 6.2 Hz, 1H), 3.54 (s, 3H), 3.44 (d, J = 5.1 Hz, 6H), 3.15-3.05 (m, 1H), 1.13 (d, J = 6.6 Hz, 3H) ppm. |

TABLE 6-continued

Hydroxylamine products (II) prepared according to Example 9:

| Cpd No. | Structure | Comments |
|---|---|---|
| (II-15) | | N-(1-cyclopropylethyl)hydroxylamine<br>49% yield<br>$^1$H NMR (400 MHz, CDCl$_3$): δ 6.39 (br s, 2H), 2.25 (dq, J = 9.2, 6.2 Hz, 1H), 1.23 (d, J = 6.6 Hz, 3H), 0.81-0-7 (m, 1H), 0.56-0.46 (m, 2H), 0.35-0.25 (m, 1H), 0.22-01.4 (m, 1H) ppm. |
| (II-16) | | N-tert-butoxy-1-(4-methoxyphenyl)ethanamine<br>97% yield<br>Analytical data are in agreement with *Angew. Chem. Int. Ed.* 2014, 53, 13278-13281. |
| (II-17) | | N-tert-butoxy-1-(2,4,6-trichlorophenyl)propan-2-amine<br>90% yield<br>$^1$H NMR (400 MHz, CDCl$_3$): δ 7.33 (s, 2H), 4.70 (br s, 1H), 3.38-3.27 (m, 1H), 3.17 (dd, J = 13.6, 6.2 Hz, 1H), 2.85 (dd, J = 13.2, 7.7 Hz, 1H), 1.15 (s, 9H), 1.1 (d, J = 6.2 Hz, 3H) ppm. |
| (II-18) | | 1-(2-bromophenyl)-N-methoxy-propan-2-amine<br>93% yield<br>$^1$H NMR (400 MHz, CDCl$_3$): δ 7.57 (d, J = 7.7 Hz, 1H), 7.29-7.24 (m, 2H), 7.14-7.06 (m, 1H), 5.52 (br s, 1H), 3.58 (s, 3H), 3.41-3.31 (m, 1H), 3.03 (dd, J = 13.2, 7.0 Hz, 1H), 2.75 (dd, J = 13.6, 7.0 Hz, 1H), 1.14 (d, J = 6.2 Hz, 3H) ppm. |
| (II-19) | | N-benzyloxy-3,3-dimethyl-butan-2-amine<br>99% yield<br>$^1$H NMR (400 mHz, CDCl$_3$): δ 7.42-7.28 (m, 5H), 5.48 (br s, 1H), 4.70 (s, 2H), 2.78 (q, J = 6.24 Hz, 1H), 1.20 (d, J = 6.2 Hz, 3H), 0.92 (s, 9H) ppm. |

Example 10: Ionic Hydrogenation of Other Substrates—Synthesis of cis-N-[2-(2,4-dichlorophenyl)cyclobutyl]acetamide Via Acylenamine Hydrogenation

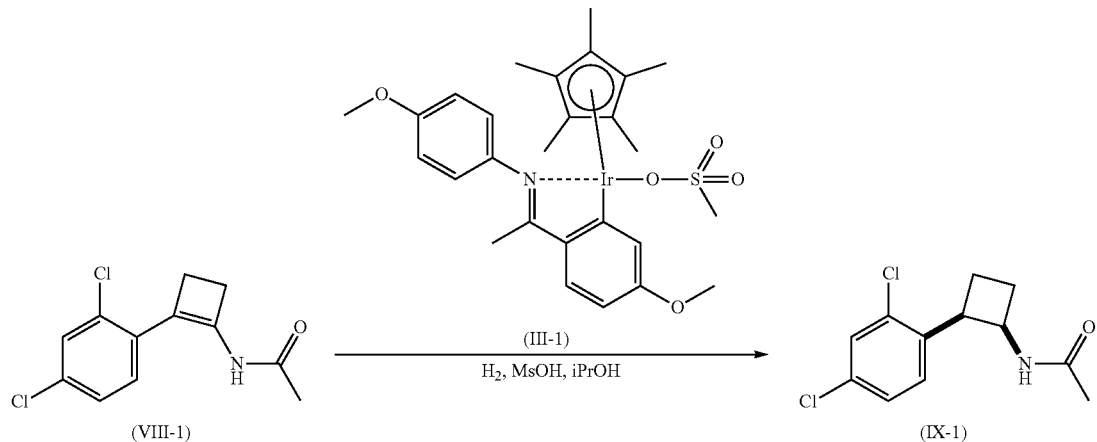

A 50 mL glass vial was charged with N-[2-(2,4-dichlorophenyl)cyclobuten-1-yl]acetamide (256 mg), catalyst (III-1) (6.8 mg), methanesulfonic acid (48 mg), and isopropanol (4 mL). The glass vial was placed in a parallel autoclave purged with hydrogen (3 times) and hydrogenated at 50 bar hydrogen and 23° C. for 16 h. Hydrogen was released and the reactor was purged with argon. GC and NMR analysis of the crude reaction mixture indicated full conversion. The reaction mixture was added slowly onto a sat. NaHCO₃ solution (15 mL) and water (10 mL), and extracted with DCM (2×15 mL). The combined organic layers were dried with Na₂SO₄, filtered and evaporated to give 250 mg of cis N-[2-(2,4-dichlorophenyl)cyclobutyl]acetamide. The analytical data are in agreement with the literature: WO15/003951.

Example 11: Ionic Hydrogenation of Other Substrates—Synthesis of 2-(trifluoromethyl)piperidine Via Heterocycle Hydrogenation

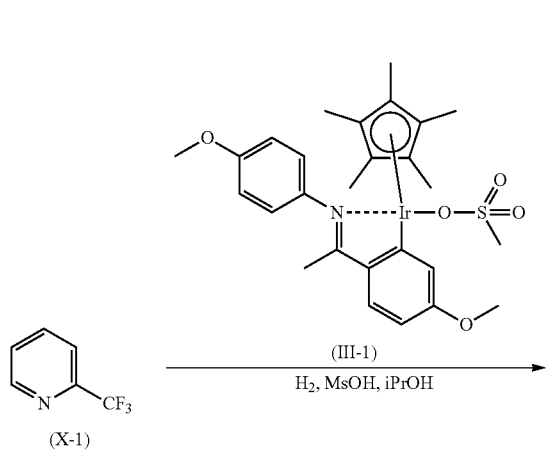

-continued

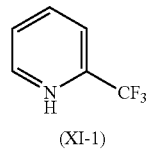

A 50 mL glass vial was charged with 2-trifluoromethylpyridine (144 mg), catalyst (III-1) (6.8 mg), methanesulfonic acid (144 mg) and isopropanol (4 mL). The glass vial was placed in a parallel autoclave purged with hydrogen (3 times) and hydrogenated at 50 bar hydrogen and 50° C. for 16 h. Hydrogen was released and the reactor was purged with argon. GC and NMR analysis of the crude reaction mixture indicated full conversion. The reaction mixture was evaporated and analysed by NMR. Full conversion of the starting material and formation of 2-(trifluoromethyl)piperidine (CAS=154630-93-0) was found.

Comparative Example 1

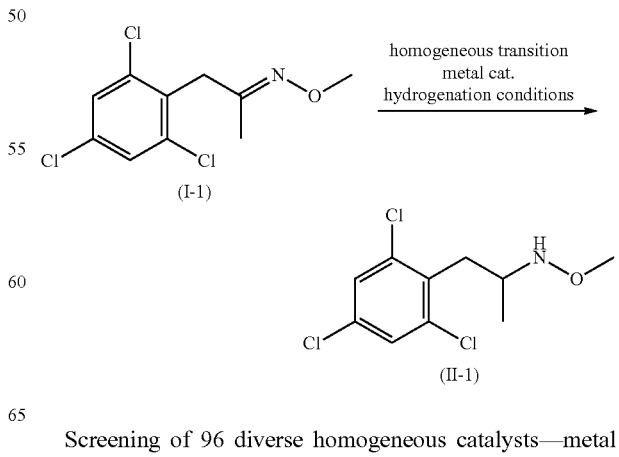

Screening of 96 diverse homogeneous catalysts—metal precursors (Rh, Ir, Pt, Ru, neutral/cationic)/ligand classes (monodentate/bidentate, phosphine, phosphite, etc.) in two solvents (THF/TFA and MeOH) at T=60° C. and pressure H$_2$=50 bar, at a catalyst loading of 2%. The conversion towards the desired product (II-1, labeled 'Product' in the table below) was determined by GC and is based on area percentages.

TABLE 7

|  | Metal Precursor, Ligand | Solvent | Product (II-1) |
|---|---|---|---|
| A1 | Rh(COD)$_2$BF$_4$, (R)-Monophos | THF/TFA | 0% |
| B1 | Rh(COD)$_2$BF$_4$, (S)-Tol-Binap | THF/TFA | 0% |
| C1 | Rh(COD)$_2$BF$_4$, (R)-DM-Segphos | THF/TFA | 0% |
| D1 | Rh(COD)$_2$BF$_4$, (S)-MeO-Biphep | THF/TFA | 0% |
| E1 | Rh(COD)$_2$BF$_4$, (S,S,R,R)-Tangphos | THF/TFA | 0% |
| F1 | Rh(COD)$_2$BF$_4$, (R,S)-Binaphos | THF/TFA | 0% |
| G1 | Rh(COD)$_2$BF$_4$, (R,R)-Kelliphite | THF/TFA | 0% |
| H1 | Rh(COD)$_2$BF$_4$, (R)-(+)-2-[2-diphenylphosphino)-phenyl]-4-isopropyl-oxazoline | THF/TFA | 0% |
| A2 | [Rh(COD)Cl]$_2$, (R)-Monophos | THF/TFA | 0% |
| B2 | [Rh(COD)Cl]$_2$, (S)-Tol-Binap | THF/TFA | 0% |
| C2 | [Rh(COD)Cl]$_2$, (R)-DM-Segphos | THF/TFA | 0% |
| D2 | [Rh(COD)Cl]$_2$, (S)-MeO-Biphep | THF/TFA | 0% |
| E2 | [Rh(COD)Cl]$_2$, (S,S,R,R)-Tangphos | THF/TFA | 0% |
| F2 | [Rh(COD)Cl]$_2$, (R,S)-Binaphos | THF/TFA | 0% |
| G2 | [Rh(COD)Cl]$_2$, (R,R)-Kelliphite | THF/TFA | 0% |
| H2 | [Rh(COD)Cl]$_2$, (R)-(+)-2-[2-diphenylphosphino)-phenyl]-4-isopropyl-oxazoline | THF/TFA | 0% |
| A3 | Ir(COD)$_2$BF$_4$, (R)-Monophos | THF/TFA | 0.09% |
| B3 | Ir(COD)$_2$BF$_4$, (S)-Tol-Binap | THF/TFA | 0% |
| C3 | Ir(COD)$_2$BF$_4$, (R)-DM-Segphos | THF/TFA | 0% |
| D3 | Ir(COD)$_2$BF$_4$, (S)-MeO-Biphep | THF/TFA | 0% |
| E3 | Ir(COD)$_2$BF$_4$, (S,S,R,R)-Tangphos | THF/TFA | 0% |
| F3 | Ir(COD)$_2$BF$_4$, (R,S)-Binaphos | THF/TFA | 0% |
| G3 | Ir(COD)$_2$BF$_4$, (R,R)-Kelliphite | THF/TFA | 0% |
| H3 | Ir(COD)$_2$BF$_4$, (R)-(+)-2-[2-diphenylphosphino)-phenyl]-4-isopropyl-oxazoline | THF/TFA | 0% |
| A4 | [Ir(COD)Cl]$_2$, (R)-Monophos | THF/TFA | 0.02% |
| B4 | [Ir(COD)Cl]$_2$, (S)-Tol-Binap | THF/TFA | 0% |
| C4 | [Ir(COD)Cl]$_2$, (R)-DM-Segphos | THF/TFA | 0.02% |
| D4 | [Ir(COD)Cl]$_2$, (S)-MeO-Biphep | THF/TFA | 0.03% |
| E4 | [Ir(COD)Cl]$_2$, (S,S,R,R)-Tangphos | THF/TFA | 0% |
| F4 | [Ir(COD)Cl]$_2$, (R,S)-Binaphos | THF/TFA | 0% |
| G4 | [Ir(COD)Cl]$_2$, (R,R)-Kelliphite | THF/TFA | 0% |
| H4 | [Ir(COD)Cl]$_2$, (R)-(+)-2-[2-diphenylphosphino)-phenyl]-4-isopropyl-oxazoline | THF/TFA | 0% |
| A5 | Pt(COD)Cl$_2$, (R)-Monophos | THF/TFA | 0% |
| B5 | Pt(COD)Cl$_2$, (S)-Tol-Binap | THF/TFA | 0% |
| C5 | Pt(COD)Cl$_2$, (R)-DM-Segphos | THF/TFA | 0% |
| D5 | Pt(COD)Cl$_2$, (S)-MeO-Biphep | THF/TFA | 0% |
| E5 | Pt(COD)Cl$_2$, (S,S,R,R)-Tangphos | THF/TFA | 0% |
| F5 | Pt(COD)Cl$_2$, (R,S)-Binaphos | THF/TFA | 0% |
| G5 | Pt(COD)Cl$_2$, (R,R)-Kelliphite | THF/TFA | 0.02% |
| H5 | Pt(COD)Cl$_2$, (R)-(+)-2-[2-diphenylphosphino)-phenyl]-4-isopropyl-oxazoline | THF/TFA | 0% |
| A6 | [Ru(cymene)Cl$_2$]$_2$, (R)-Monophos | THF/TFA | 0.02% |
| B6 | [Ru(cymene)Cl$_2$]$_2$, (S)-Tol-Binap | THF/TFA | 0% |
| C6 | [Ru(cymene)Cl$_2$]$_2$, (R)-DM-Segphos | THF/TFA | 0% |
| D6 | [Ru(cymene)Cl$_2$]$_2$, (S)-MeO-Biphep | THF/TFA | 0% |
| E6 | [Ru(cymene)Cl$_2$]$_2$, (S,S,R,R)-Tangphos | THF/TFA | 0% |
| F6 | [Ru(cymene)Cl$_2$]$_2$, (R,S)-Binaphos | THF/TFA | 0% |
| G6 | [Ru(cymene)Cl$_2$]$_2$, (R,R)-Kelliphite | THF/TFA | 0% |
| H6 | [Ru(cymene)Cl$_2$]$_2$, (R)-(+)-2-[2-diphenylphosphino)-phenyl]-4-isopropyl-oxazoline | THF/TFA | 0% |
| A7 | Rh(COD)$_2$BF$_4$, (R)-Monophos | MeOH | 0% |
| B7 | Rh(COD)$_2$BF$_4$, (S)-Tol-Binap | MeOH | 0% |
| C7 | Rh(COD)$_2$BF$_4$, (R)-DM-Segphos | MeOH | 0% |
| D7 | Rh(COD)$_2$BF$_4$, (S)-MeO-Biphep | MeOH | 0% |
| E7 | Rh(COD)$_2$BF$_4$, (S,S,R,R)-Tangphos | MeOH | 0% |
| F7 | Rh(COD)$_2$BF$_4$, (R,S)-Binaphos | MeOH | 0% |
| G7 | Rh(COD)$_2$BF$_4$, (R,R)-Kelliphite | MeOH | 0% |
| H7 | Rh(COD)$_2$BF$_4$, (R)-(+)-2-[2-diphenylphosphino)-phenyl]-4-isopropyl-oxazoline | MeOH | 0% |
| A8 | [Rh(COD)Cl]$_2$, (R)-Monophos | MeOH | 0% |
| B8 | [Rh(COD)Cl]$_2$, (S)-Tol-Binap | MeOH | 0% |
| C8 | [Rh(COD)Cl]$_2$, (R)-DM-Segphos | MeOH | 0% |
| D8 | [Rh(COD)Cl]$_2$, (S)-MeO-Biphep | MeOH | 0% |
| E8 | [Rh(COD)Cl]$_2$, (S,S,R,R)-Tangphos | MeOH | 0% |
| F8 | [Rh(COD)Cl]$_2$, (R,S)-Binaphos | MeOH | 0% |
| G8 | [Rh(COD)Cl]$_2$, (R,R)-Kelliphite | MeOH | 0% |
| H8 | [Rh(COD)Cl]$_2$, (R)-(+)-2-[2-diphenylphosphino)-phenyl]-4-isopropyl-oxazoline | MeOH | 0% |

TABLE 7-continued

| | Metal Precursor, Ligand | Solvent | Product (II-1) |
|---|---|---|---|
| A9 | Ir(COD)$_2$BF$_4$, (R)-Monophos | MeOH | 0.02% |
| B9 | Ir(COD)$_2$BF$_4$, (S)-Tol-Binap | MeOH | 0% |
| C9 | Ir(COD)$_2$BF$_4$, (R)-DM-Segphos | MeOH | 0% |
| D9 | Ir(COD)$_2$BF$_4$, (S)-MeO-Biphep | MeOH | 0% |
| E9 | Ir(COD)$_2$BF$_4$, (S,S,R,R)-Tangphos | MeOH | 0% |
| F9 | Ir(COD)$_2$BF$_4$, (R,S)-Binaphos | MeOH | 0% |
| G9 | Ir(COD)$_2$BF$_4$, (R,R)-Kelliphite | MeOH | 0% |
| H9 | Ir(COD)$_2$BF$_4$, (R)-(+)-2-[2-diphenylphosphino)-phenyl]-4-isopropyl-oxazoline | MeOH | 0% |
| A10 | [Ir(COD)Cl]$_2$, (R)-Monophos | MeOH | 0.75% |
| B10 | [Ir(COD)Cl]$_2$, (S)-Tol-Binap | MeOH | 0% |
| C10 | [Ir(COD)Cl]$_2$, (R)-DM-Segphos | MeOH | 0% |
| D10 | [Ir(COD)Cl]$_2$, (S)-MeO-Biphep | MeOH | 0% |
| E10 | [Ir(COD)Cl]$_2$, (S,S,R,R)-Tangphos | MeOH | 0% |
| F10 | [Ir(COD)Cl]$_2$, (R,S)-Binaphos | MeOH | 0.05% |
| G10 | [Ir(COD)Cl]$_2$, (R,R)-Kelliphite | MeOH | 0.02% |
| H10 | [Ir(COD)Cl]$_2$, (R)-(+)-2-[2-diphenylphosphino)-phenyl]-4-isopropyl-oxazoline | MeOH | 0% |
| A11 | Pt(COD)Cl$_2$, (R)-Monophos | MeOH | 0.02% |
| B11 | Pt(COD)Cl$_2$, (S)-Tol-Binap | MeOH | 0.04% |
| C11 | Pt(COD)Cl$_2$, (R)-DM-Segphos | MeOH | 0% |
| D11 | Pt(COD)Cl$_2$, (S)-MeO-Biphep | MeOH | 0% |
| E11 | Pt(COD)Cl$_2$, (S,S,R,R)-Tangphos | MeOH | 0% |
| F11 | Pt(COD)Cl$_2$, (R,S)-Binaphos | MeOH | 0% |
| G11 | Pt(COD)Cl$_2$, (R,R)-Kelliphite | MeOH | 0.73% |
| H11 | Pt(COD)Cl$_2$, (R)-(+)-2-[2-diphenylphosphino)-phenyl]-4-isopropyl-oxazoline | MeOH | 0% |
| A12 | [Ru(cymene)Cl$_2$]$_2$, (R)-Monophos | MeOH | 0% |
| B12 | [Ru(cymene)Cl$_2$]$_2$, (S)-Tol-Binap | MeOH | 0% |
| C12 | [Ru(cymene)Cl$_2$]$_2$, (R)-DM-Segphos | MeOH | 0% |
| D12 | [Ru(cymene)Cl$_2$]$_2$, (S)-MeO-Biphep | MeOH | 0% |
| E12 | [Ru(cymene)Cl$_2$]$_2$, (S,S,R,R)-Tangphos | MeOH | 0% |
| F12 | [Ru(cymene)Cl$_2$]$_2$, (R,S)-Binaphos | MeOH | 0.04% |
| G12 | [Ru(cymene)Cl$_2$]$_2$, (R,R)-Kelliphite | MeOH | 0% |
| H12 | [Ru(cymene)Cl$_2$]$_2$, (R)-(+)-2-[2-diphenylphosphino)-phenyl]-4-isopropyl-oxazoline | MeOH | 0% |

These experiments demonstrate that combinations of commonly used metal precursors and ligands doesn't allow homogeneous hydrogenation of oxime substrates such as (I-1) as in all cases, the amount of product (II-1) formed was <1%.

Comparative Example 2

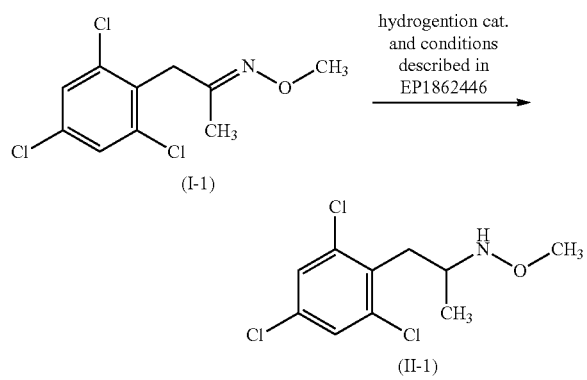

Hydrogenation conditions: Temperature=60° C. and pressure H$_2$=60 bar, Time=20 h. Reaction conditions as described in EP1862446. The conversion towards the desired product ((II-1), labeled 'Product' in the table below) was determined by GC and is based on area percentages.

TABLE 8

| Conditions | Product (II-1)% |
|---|---|
| Rh(COD)$_2$BF$_4$ (1.2 mol %), SL-J002-1* (2 mol %), HBF$_4$•Et$_2$O (4 eq.), THF | 0% |
| Rh(COD)$_2$BF$_4$ (0.12 mol %), SL-J002-1* (0.2 mol %), HBF$_4$•Et$_2$O (4 eq.), THF | 0% |
| Rh(COD)$_2$BF$_4$ (1.2 mol %), SL-J002-1* (2 mol %), CF$_3$COOH (4 eq.), CF$_3$CH$_2$OH | 0% |
| Rh(COD)$_2$BF$_4$ (0.12 mol %), SL-J002-1* (0.2 mol %), CF$_3$COOH (4 eq.), CF$_3$CH$_2$OH | 0% |
| Ir(COD)$_2$BF$_4$ (1.2 mol %), SL-J002-1* (2 mol %), HBF$_4$•Et$_2$O (4 eq.), THF | <10% |
| Ir(COD)$_2$BF$_4$ (0.12 mol %), SL-J002-1* (0.2 mol %), HBF$_4$•Et$_2$O (4 eq.), THF | Trace (<1%) |
| Ir(COD)$_2$BF$_4$ (1.2 mol %), SL-J002-1* (2 mol %), CF$_3$COOH (4 eq.), CF$_3$CH$_2$OH | 0% |
| Ir(COD)$_2$BF$_4$ (0.12 mol %), SL-J002-1* (0.2 mol %), CF$_3$COOH (4 eq.), CF$_3$CH$_2$OH | 0% |

*SL-J002-1 = (R)-1-[(SP)-2-(Diphenylphosphino)ferrocenyl]ethyldi-tert-butylphosphine In all cases, low selectivity and no or very low yield of the desired product (II-1, labeled 'Product' in the table above) was observed. These experiments demonstrate that the catalysts and conditions described in EP 1862446 A2 do not allow efficient hydrogenation of oxime substrates such as (II-1).

Comparative Example 3
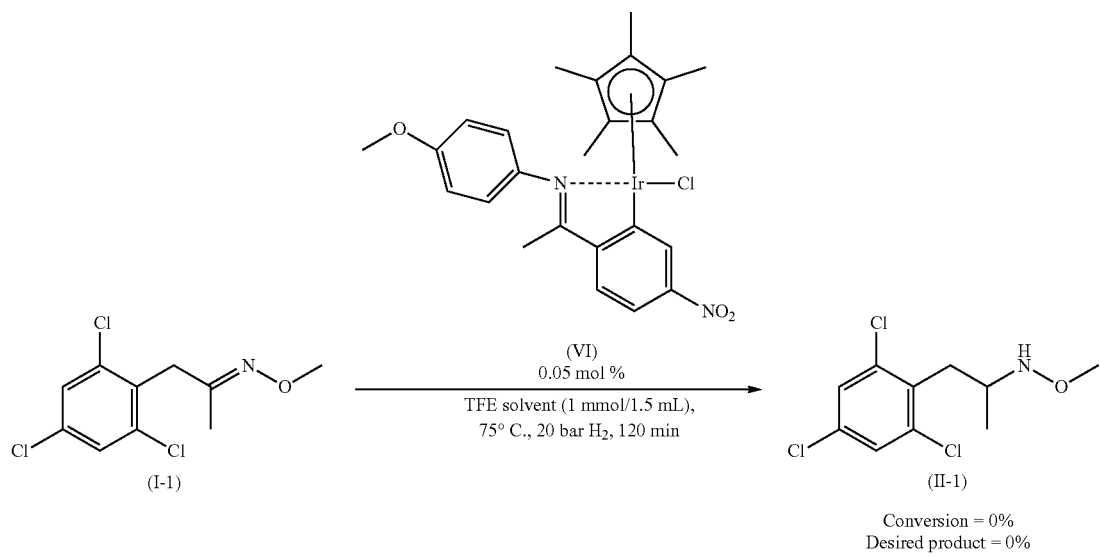
No formation of the desired product (II-1) was observed under reaction conditions as described in *Org. Biomol. Chem.*, 2013, 11, 6934.
Comparative Example 4
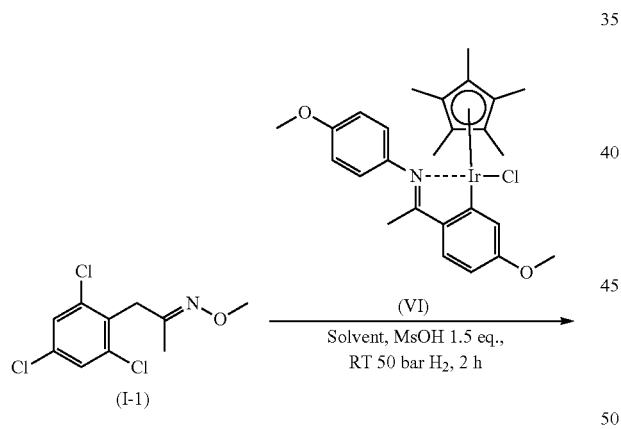
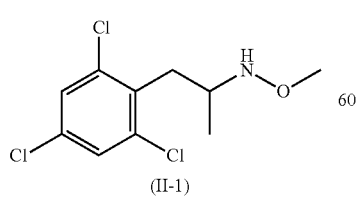

| Conditions | Conversion % | Product (II-1)% |
|---|---|---|
| Catalyst 0.5 mol %, Solvent = THF, 50° C. | 0% | 0% |
| Catalyst 0.1 mol %, Solvent = iPrOH, RT | 0% | 0% |

No formation of the desired product (II-1) was observed under reaction conditions as described in our invention, but using an iridium chloro complex (VI) (as reported for example in *Org. Biomol. Chem.*, 2013, 11, 6934; WO 2013/153407). These experiments demonstrate that iridium halogen complexes are not efficient as catalysts in the current process.

Comparative Example 5

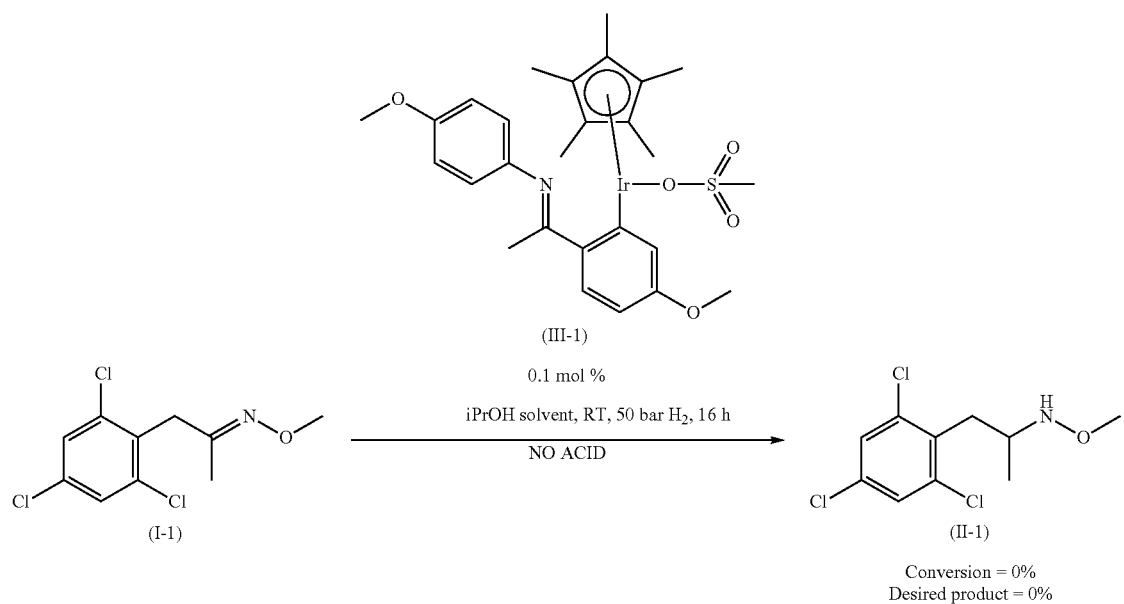

Conversion = 0%
Desired product = 0%

When utilizing the reaction conditions of the present invention without acid, the formation of the desired product (II-1) was not observed. This experiment demonstrates that a stoichiometric amount of a suitable acid is essential in the process according our invention.

What is claimed is:

1. A process for the hydrogenation of an oxime of formula (I) to produce a hydroxylamine salt of formula (II) by reacting oxime (I) with hydrogen in the presence of an iridium catalyst of formula (IIIa) or formula (IIIb) and an acid;

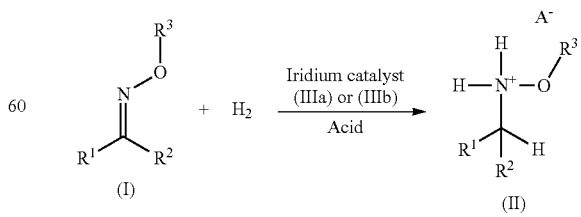

-continued

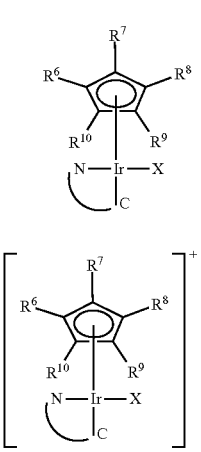

(IIIa)

(IIIb)

wherein $R^1$, $R^2$ and $R^3$ are each independently hydrogen, $C_1$-$C_8$alkyl, $C_1$-$C_8$hydroxyalkyl, $C_1$-$C_8$cyanoalkyl, $C_1$-$C_6$alkoxy$C_1$-$C_8$alkyl, di($C_1$-$C_6$alkoxy) $C_1$-$C_8$alkyl, $C_1$-$C_8$haloalkyl, $C_2$-$C_6$alkenyl, $C_3$-$C_8$cycloalkyl, phenyl, phenyl$C_1$-$C_8$alkyl or heteroaryl, and wherein the cycloalkyl and phenyl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, nitro and $C_2$-$C_6$alkenyl; or $R^1$ and $R^2$ together with the carbon atom to which they are attached may form a 4- to 8-membered saturated cycloalkyl or heterocyclyl ring, wherein the heterocyclic moiety is a non-aromatic monocyclic ring which comprises 1, 2 or 3 heteroatoms, wherein the heteroatoms are individually selected from N, O and S;

$R^6$, $R^7$, $R^8$, $R^9$ and $R^{10}$ are each independently hydrogen or $C_1$-$C_3$alkyl;

represents a bidentate chelating ligand comprising at least one carbon atom which coordinates to iridium and at least one nitrogen atom which coordinates to iridium;

X represents an anionic group of the formula $R^{14}$—$SO_2O$— or $R^{15}$—$C(O)O$—, wherein $R^{14}$ is hydroxy, $C_{1-6}$alkyl, $C_{1-6}$alkoxy, $C_{1-6}$haloalkyl, or phenyl, wherein the phenyl moieties are optionally substituted by 1, 2, 3 or 4 substituents, which may be the same or different, selected from $R^{16}$;

$R^{16}$ is $C_{1-4}$alkyl, $C_{1-4}$haloalkyl, nitro, or halogen;

$R^{15}$ is $C_{1-6}$haloalkyl or phenyl, wherein the phenyl moieties are optionally substituted by 1, 2, 3 or 4 substituents, which may be the same or different, selected from $R^{17}$, $R^{17}$ is $C_{1-4}$alkyl, $C_{1-4}$haloalkyl, nitro or halogen;

Y represents a neutral ligand; and

Z represents an anionic group.

2. The process according to claim 1, wherein $R^6$, $R^7$, $R^8$, $R^9$ and $R^{10}$ each represent hydrogen or methyl.

3. The process according to claim 1, wherein X represents a group of the formula $R^{14}$—$SO_2O^-$.

4. The process according to claim 1, wherein the bidentate chelating ligand is selected from a compound of formula (IV-1), (IV-2), (IV-3), (IV-5), (IV-6), (IV-7), (IV-8), (IV-9), (IV-10), (IV-11) and (IV-12):

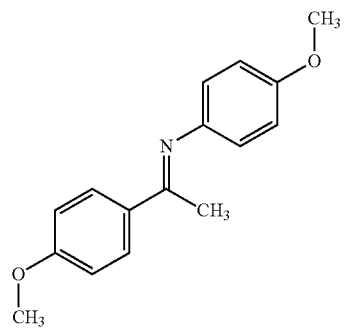

(IV-1)

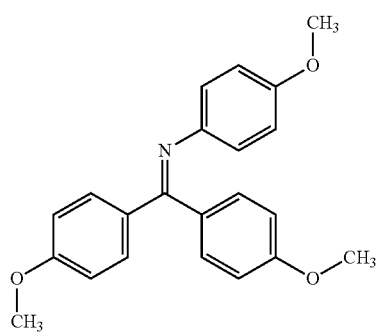

(IV-2)

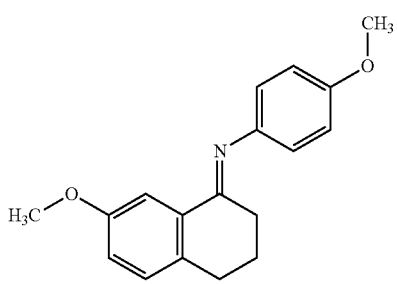

(IV-3)

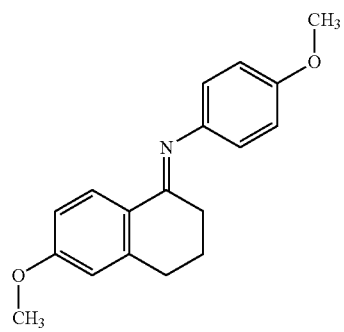

(IV-4)

(IV-5) 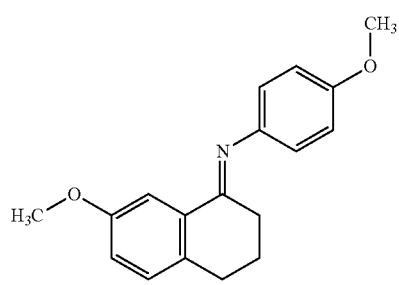

(IV-6) 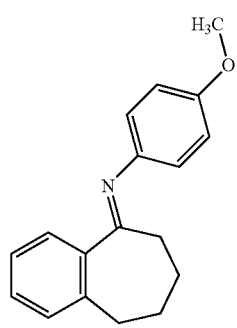

(IV-7) 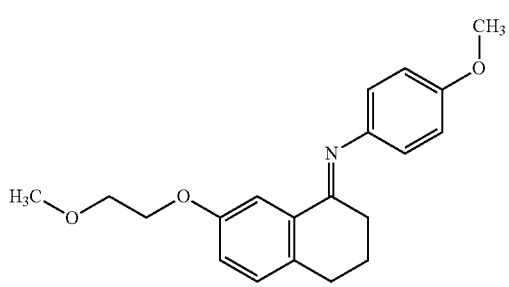

(IV-8) 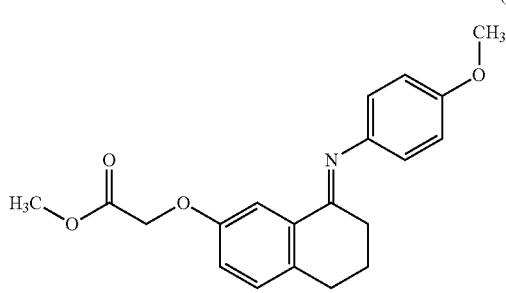

(IV-9) 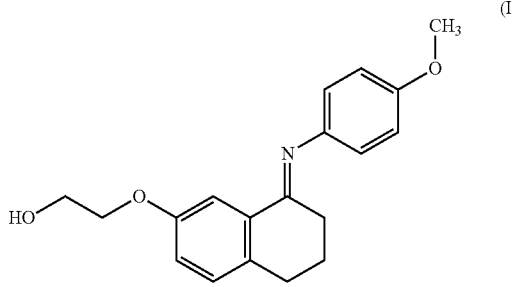

(IV-10) 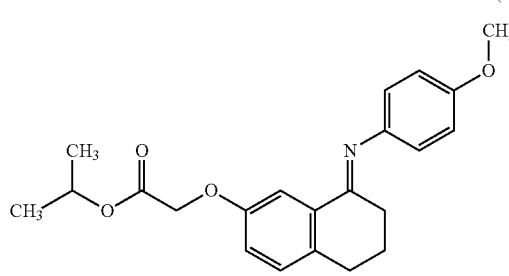

(IV-11) 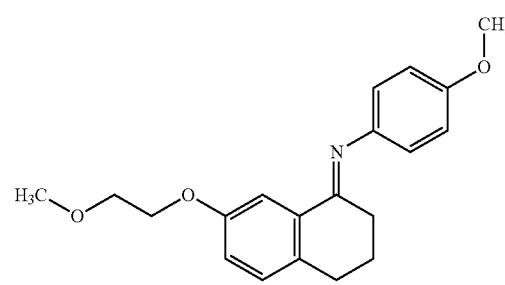

(IV-12) 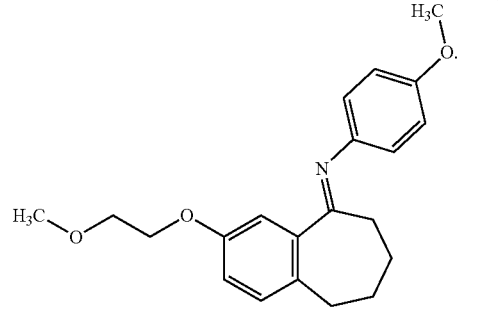

5. The process according to claim 1, wherein Z is $R^{14}$—$SO_2O^-$, mesylate, sulfate, hydrogenosulfate, tetrafluoroborate, hexafluorophosphate, tetraphenylborate, or tetrakis(3,5-bis(trifluoromethyl)phenyl)borate.

6. The process according to claim 1, wherein the acid is methanesulfonic acid, p-toluenesulfonic acid, camphorsulfonic acid, sulfuric acid or triflic acid.

7. The process according to claim 1, wherein Y is $H_2O$ or MeCN.

8. The process according to claim 1, wherein the iridium catalyst is a compound of formula (III-1), (III-11), (III-17), (III-18), or (III-19):

(III-1) 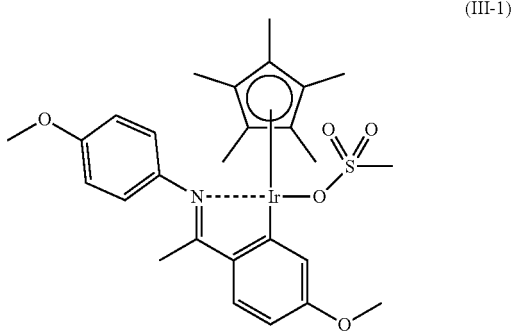

(III-11)

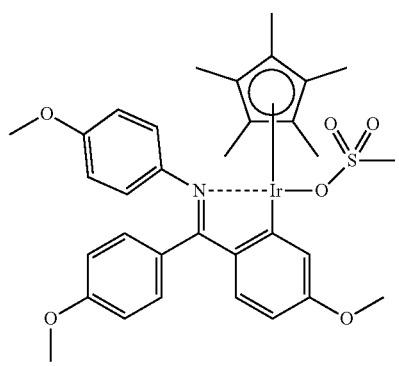

(III-17)

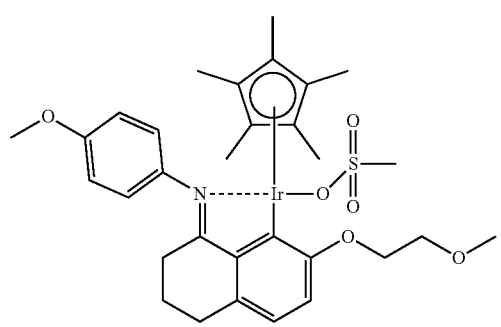

(III-18)

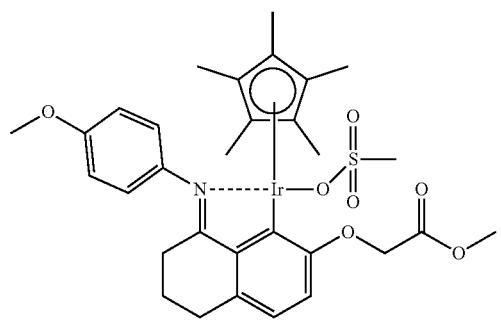

(III-19)

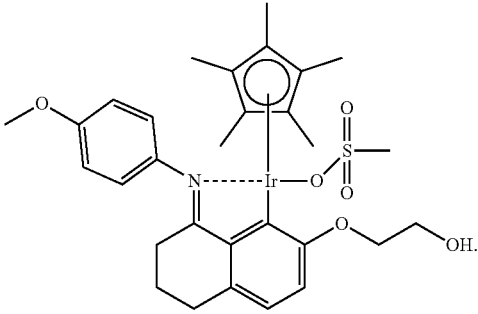

9. The process according to claim 1, wherein the hydroxylamine of formula (II) is N-methoxy-1-(2,4,6-trichlorophenyl) propan-2-amine (II-1).

10. The process according to claim 9, wherein N-methoxy-1-(2,4,6-trichlorophenyl)propan-2-amine (II-1) is further reacted with 3-(difluoromethyl)-1-methyl-pyrazole-4-carbonyl chloride (XII) to provide 3-(difluoromethyl)-N-methoxy-1-methyl-N-[1-methyl-2-(2,4,6-trichlorophenyl)ethyl]pyrazole-4-carboxamide (XIII):

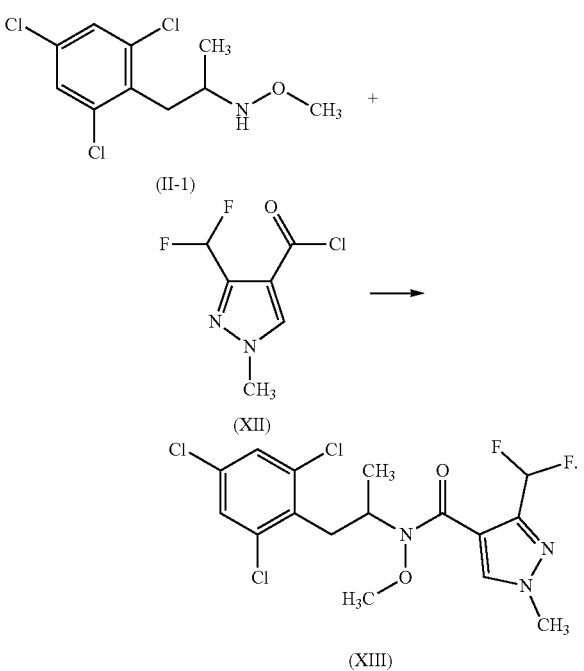

* * * * *